United States Patent
Ezra et al.

(10) Patent No.: US 8,082,397 B1
(45) Date of Patent: Dec. 20, 2011

(54) PRIVATE SLOT

(75) Inventors: Josef Ezra, Ashland, MA (US); Adi Ofer, Framingham, MA (US)

(73) Assignee: EMC Corporation, Hopkinton, MA (US)

( * ) Notice: Subject to any disclaimer, the term of this patent is extended or adjusted under 35 U.S.C. 154(b) by 340 days.

(21) Appl. No.: 10/955,136

(22) Filed: Sep. 30, 2004

Related U.S. Application Data

(60) Provisional application No. 60/601,397, filed on Aug. 13, 2004.

(51) Int. Cl.
*G06F 12/02* (2006.01)

(52) U.S. Cl. ........ 711/130; 711/118; 711/119; 711/121; 711/123

(58) Field of Classification Search ............... 711/130, 711/118, 121, 123, 119
See application file for complete search history.

(56) References Cited

U.S. PATENT DOCUMENTS

| | | | |
|---|---|---|---|
| 5,206,939 A | 4/1993 | Yanai et al. | |
| 5,381,539 A | 1/1995 | Yanai et al. | |
| 5,592,432 A | 1/1997 | Vishlitzky et al. | |
| 5,778,394 A | 7/1998 | Galtzur et al. | |
| 5,845,147 A | 12/1998 | Vishlitzky et al. | |
| 5,857,208 A | 1/1999 | Ofek | |
| 7,136,883 B2 * | 11/2006 | Flamma et al. | 707/204 |
| 2002/0032844 A1 * | 3/2002 | West | 711/171 |
| 2002/0046324 A1 * | 4/2002 | Barroso et al. | 711/122 |
| 2003/0140209 A1 * | 7/2003 | Testardi | 711/203 |

OTHER PUBLICATIONS

U.S. Appl. No. 09/535,134, filed Mar. 24, 2000, Lambright, et al.
U.S. Appl. No. 10/080,321, filed Feb. 21, 2002, Ezra, et al.
U.S. Appl. No. 10/853,035, filed May 25, 2004, Levin-Michael et al.

* cited by examiner

*Primary Examiner* — Jae Yu

(74) *Attorney, Agent, or Firm* — Muirhead and Saturnelli, LLC

(57) ABSTRACT

Described are techniques and criteria used in connection with cache management. The cache may be organized as a plurality of memory banks in which each memory bank includes a plurality of slots. Each memory bank has an associated control slot that includes groups of extents of tags. Each cache slot has a corresponding tag that includes a bit value indicating the availability of the associated cache slot, and a time stamp indicating the last time the data in the slot was used. The cache may be shared by multiple processors. Exclusive access of the cache slots is implemented using an atomic compare and swap instruction. The time stamp of slots in the cache may be adjusted to indicate ages of slots affecting the amount of time a particular portion of data remains in the cache. Each director may obtain a cache slot from a private stack of nondata cache slots in addition to accessing a shared cache used by all directors.

26 Claims, 22 Drawing Sheets

| DIRECTOR 592 | INTERVAL 594 | TIMESTAMP 596 |
|---|---|---|
| 1 | | |
| 2 | | |
| 3 | | |
| .. .. | | |
| N-1 | | |
| N | | |

PRIVATE SLOT

RELATED APPLICATIONS

This application claims priority to U.S. Provisional Patent Application No. 60/601,397, filed on Aug. 13, 2004, which is incorporated by reference herein.

BACKGROUND

1. Technical Field

This application generally relates to caching, and more particularly to cache management as may be used in a data storage system.

2. Description of Related Art

Computer systems may include different resources used by one or more host processors. Resources and host processors in a computer system may be interconnected by one or more communication connections. These resources may include, for example, data storage devices such as the Symmetrix™ family of data storage systems manufactured by EMC Corporation. These data storage systems may be coupled to one or more host processors and provide storage services to each host processor. An example data storage system may include one or more data storage devices, such as those of the Symmetrix™ family, that are connected together and may be used to provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units. The logical disk units may or may nor correspond to the actual disk drives. Allowing multiple host systems to access the single storage device unit allows the host systems to share data stored therein.

Performance of a storage system may be improved by using a cache. In the case of a disk drive system, the cache may be implemented using a block of semiconductor memory that has a relatively lower data access time than the disk drive. Data that is accessed is advantageously moved from the disk drives to the cache so that the second and subsequent accesses to the data may be made to the cache rather than to the disk drives. Data that has not been accessed recently may be removed from the cache to make room for new data. Often such cache accesses are transparent to the host system requesting the data.

Data may be stored in a cache in order to increase efficiency. However, there can be a cost associated with performing cache management operations, such as storing and retrieving data from the cache.

One technique for implementing a cache is to store the data in blocks and link each of the blocks together in a doubly linked ring list referred to herein as a replacement queue. Each block of the replacement queue represents a block of data from a logical disk unit. The blocks or slots are placed in the doubly linked ring list in the order in which they are retrieved from the disk. A pointer may point to the block that was most recently added to the list. Thus, when a new block is to be added to the cache within the replacement queue, the structure of the replacement queue, in combination with the head pointer, may be used to determine the oldest block in the replacement queue that is to be removed to make room for the new block. An implementation of the replacement queue may use both a "head" pointer and a "tail" pointer identifying, respectively, the beginning and end of the replacement queue. The "tail" may determine the oldest block or slot in the replacement queue. Two such pointers may be used in an replacement queue arrangement as it may be desirable in accordance with cache management schemes in which some data may remain permanently in the cache and the "oldest" and "newest" data may not be adjacent to one another.

Cache management techniques are described, for example, in issued U.S. Pat. No. 5,381,539, Jan. 10, 1995, entitled "System and Method for Dynamically Controlling Cache Management", Yanai et al., assigned to EMC Corporation of Hopkinton, Mass., which is herein incorporated by reference, in which a data storage system has a cache controlled by parameters including: (a) a minimum number of data storage elements which must be retrieved and stored in cache memory and used by the system before the cache management system recognizes a sequential data access in progress; (b) the maximum number of tracks or data records which the cache management system is to prefetch ahead; and (c) the maximum number of sequential data elements to be stored in cache before the memory containing the previously used tracks or data records are reused or recycled and new data written to these locations. The cache memory is in a least-recently used circular configuration in which the cache management system overwrites or recycles the oldest or least recently used memory location. The cache manager provides monitoring and dynamic adjustment of the foregoing parameters.

Described in issued U.S. Pat. No. 5,592,432, Jan. 7, 1997, entitled "Cache Management System Using Time Stamping for Replacement Queue", Vishlitzky et al., which is herein incorporated by reference, is a system that includes a cache directory listing data elements in a cache memory and a cache manager memory including a replacement queue and data structures. A cache manager determines which data element should be removed or replaced in the cache memory based on the elapsed time the data element has been in the memory. If the elapsed time is less than a predetermined threshold, the data element will be maintained in the same location in the replacement queue saving a number of cache management operations. The predetermined threshold is established as the average fall through time (FTT) of prior data elements in the memory. A modified least-recently-used replacement procedure uses time stamps indicating real or relative time when a non-write-pending data element was promoted to the tail of the replacement queue, the most-recently used position. Also disclosed is another embodiment in which the number of times the data element is accessed while in the memory is compared to a fixed number. If the data element has been accessed more than the fixed number, it is placed at the tail of the replacement queue ensuring a longer period for the data element in the memory.

Described in U.S. Pat. No. 5,206,939, Apr. 27, 1993, entitled "System and Method for Disk Mapping and Retrieval", Yanai et al, which is herein incorporated by reference, is a device-by-device cache index/directory used in disk mapping and data retrieval.

Different techniques may be used to manage the cache. In some implementations, cache management operations may be costly in terms of computer resources, such as execution time and memory. For example, it may costly to determine an available slot for use. An executing processor may make multiple attempts at different slots before locating one which can be used to store new data in the cache. There are also costs associated with inserting and removing an element from the cache that may vary with the particular cache implementation and associated data structures.

Thus, it may be desirable to provide an efficient cache management technique which reduces the costs associated with cache management. The reduction may be produced as a result of more efficient processing of one or more individual operations. The reduction may also be produced by reducing the frequency with which any one or more cache management operations are performed in cache operation.

SUMMARY OF THE INVENTION

In accordance with one aspect of the invention is a method for cache management comprising: providing for each processor a private cache including only nondata cache slots; providing a shared cache including cache slots accessible by a plurality of processors; and wherein a cache slot for use by a processor is determined by selecting a cache slot from said private cache of said processor if said private cache is not empty, and wherein a cache slot is selected from said shared cache otherwise. The method for cache management may be used in a data storage system, each processor being a director included in the data storage system, and said cache slot may be selected in connection with processing an I/O operation. The method may also include performing by said processor: determining whether a first cache slot is a data cache slot or a non-data cache slot; if said first cache slot is a non-data cache slot, designating said first cache slot as being included in said private cache of said processor; and if said first cache slot is a data cache slot, indicating that said first cache slot is available for use by all of said plurality of processors. The method may include determining if said private cache of said processor is full; and indicating that said first cache slot is available for use by all of said plurality of processors if said private cache is full. The first cache slot may be indicated as being included in said private cache or said shared cache in accordance with a first indicator associated with said first cache slot. The first cache slot may be included in said private cache and may include a unique processor identifier identifying the particular processor that is associated with said private cache. The first cache slot may be indicated as unavailable for use by any processor other than said particular processor by a second indicator in said cache slot. The method may include updating said first indicator to indicate that said first slot is included in said shared cache after obtaining a lock on said first slot for exclusive access. The method may include retrying to obtain said lock a plurality of times if previous attempts to obtain said lock indicate that another processor currently has said lock. The first cache slot may be indicated as being a private cache slot and may be physically located in a memory next to a second cache slot indicated as being included in said shared cache available for use by a plurality of processors. The selected cache slot may be selected from said private cache slot and the method may further comprise determining whether said cache slot is to be included in said shared cache in accordance with an I/O operation associated with said selected cache slot. The cache slot may remain not available for reuse by said plurality of processors if data included in said cache slot is associated with a pending write operation. The cache slot may be designated as available for reuse by said plurality of processors if said cache slot is associated with a read operation.

In accordance with another aspect of the invention is a computer program product for cache management comprising code that: provides for each processor a private cache including only nondata cache slots; provides a shared cache including cache slots accessible by a plurality of processors; and wherein a cache slot for use by a processor is determined by selecting a cache slot from said private cache of said processor if said private cache is not empty, and wherein a cache slot is selected from said shared cache otherwise. The cache management may be used a data storage system, each processor being a director included in the data storage system, and said cache slot may be selected in connection with processing an I/O operation. The computer program product may include code that causes said processor to perform: determining whether a first cache slot is a data cache slot or a non-data cache slot; if said first cache slot is a non-data cache slot, designating said first cache slot as being included in said private cache of said processor; and if said first cache slot is a data cache slot, indicating that said first cache slot is available for use by all of said plurality of processors. The computer program product may include code that: determines if said private cache of said processor is full; and indicates that said first cache slot is available for use by all of said plurality of processors if said private cache is full. The first cache slot may be indicated as being included in said private cache or said shared cache in accordance with a first indicator associated with said first cache slot. The first cache slot may be included in said private cache and may include a unique processor identifier identifying the particular processor that is associated with said private cache. The first cache slot may be indicated as unavailable for use by any processor other than said particular processor by a second indicator in said cache slot. The computer program product may also include code that: updates said first indicator to indicate that said first slot is included in said shared cache after obtaining a lock on said first slot for exclusive access. The computer program product may also include code that: retries to obtain said lock a plurality of times if previous attempts to obtain said lock indicate that another processor currently has said lock. The first cache slot may be indicated as being a private cache slot and may be physically located in a memory next to a second cache slot indicated as being included in said shared cache available for use by a plurality of processors. The selected cache slot may be selected from said private cache slot and the computer program product may further comprise code that determines whether said cache slot is to be included in said shared cache in accordance with an I/O operation associated with said selected cache slot. The cache slot may remain not available for reuse by said plurality of processors if data included in said cache slot is associated with a pending write operation. The cache slot may be designated as available for reuse by said plurality of processors if said cache slot is associated with a read operation.

BRIEF DESCRIPTION OF THE DRAWINGS

Features and advantages of the present invention will become more apparent from the following detailed description of exemplary embodiments thereof taken in conjunction with the accompanying drawings in which:

FIG. 12 is an example representation of an embodiment of a heartbeat table;

DETAILED DESCRIPTION OF EMBODIMENT(S)

Figure 1:
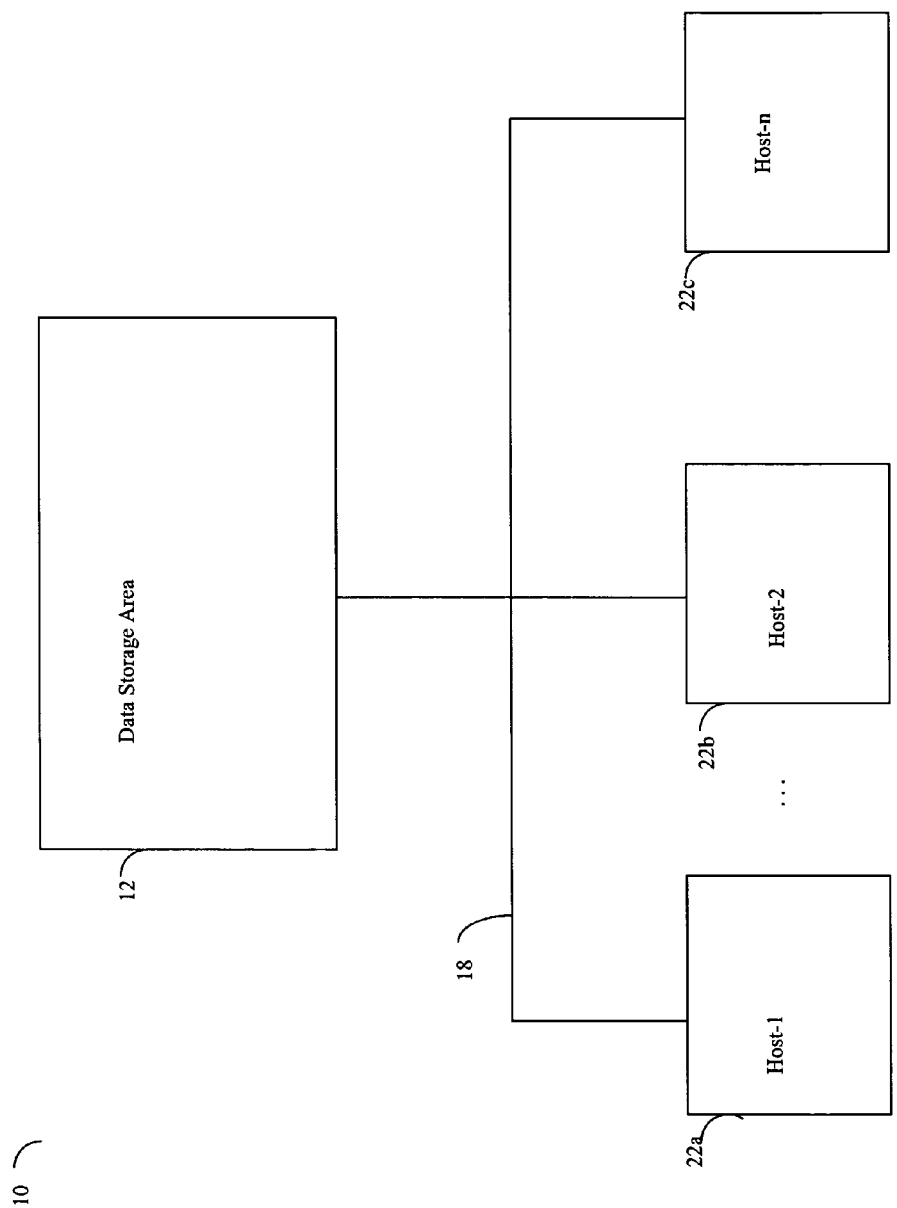
FIG. 1 is an example of an embodiment of a computer system according to the present invention.

Referring now to FIG. 1, shown is an example of an embodiment of a computer system. The computer system 10 includes a data storage area 12 connected to host systems 22a-22c through communication medium 18. In this embodiment of the computer system 10, the N hosts 22a-22c may access the data storage area 12, for example, in performing input/output (I/O) operations or data requests. The communication medium 18 may be any one of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network or other connection(s) by which the host systems 22a-22c may access and communicate with the data storage area 12, and may also communicate with each other and other components included in the computer system 10.

Each of the host systems 22a-22c and the data storage area 12 included in the computer system 10 may be connected to the communication medium 18 by any one of a variety of connections as may be provided and supported in accordance with the type of communication medium 18. The processors included in the host computer systems 22a-22c may be any one of a variety of proprietary or commercially available single or multi-processor system, such as an Intel-based processor, IBM mainframe or other type of commercially available processor able to support incoming and outgoing traffic in accordance with each particular embodiment and application.

It should be noted that the particulars of the hardware and software included in each of the host systems 22a-22c and the data storage area 12 are described herein in more detail, and may vary with each particular embodiment. Each of the host computers 22a-22c may all be located at the same physical site, or, alternatively, may also be located in different physical locations. Examples of the communication medium that may be used to provide the different types of connections between the host computer systems and the data storage area of the computer system 10 may use a variety of different communication protocols such as SCSI, ESCON, Fibre Channel, or GIGE (Gigabit Ethernet), and the like. Some or all of the connections by which the hosts and data storage area 12 may be connected to the communication medium 18 may pass through other communication devices, such as a Connectrix or other switching equipment that may exist such as a phone line, a repeater, a multiplexer or even a satellite.

Each of the host computer systems may perform different types of data operations in accordance with different types of administrative tasks. In the embodiment of FIG. 1, any one of the host computers 22a-22c may issue a data request to the data storage area 12 to perform a data operation, such as a read or write operation.

Figure 2A:
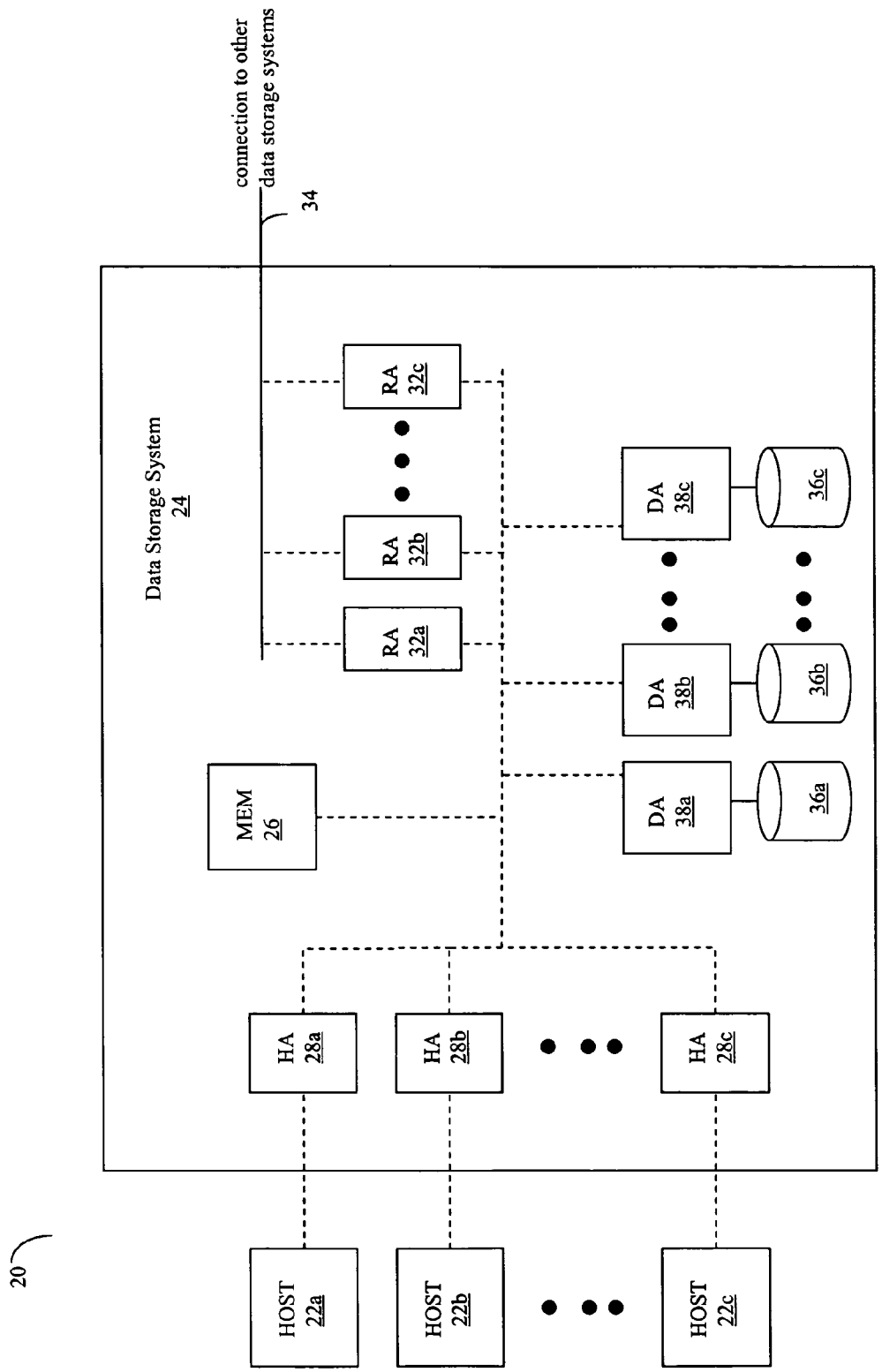
FIG. 2A is an example of an embodiment of a data storage system.

Referring now to FIG. 2A, shown is a diagram 20 illustrating additional detail of one embodiment of the system 10 of FIG. 1. The plurality of hosts 22a-22c are coupled to a data storage system 24. The data storage system 24 may be one of a plurality of data storage systems included in the data storage area 12. The data storage system 24 includes an internal memory 26 that facilitates operation of the storage system 24 as described elsewhere herein. The data storage system also includes a plurality of host adaptors (HA's) 28a-28c that handle reading and writing of data between the hosts 22a-22c and the storage system 24. Although the diagram 20 shows each of the hosts 22a-22c coupled to each of the HA's 28a-28c, it will be appreciated by one of ordinary skill in the art that one or more of the HA's 28a-28c may be coupled to other hosts.

The storage system 24 may include one or more RDF adapter units (RA's) 32a-32c. The RA's 32a-32c are coupled to an RDF link 34 and are similar to the HA's 28a-28c, but are used to transfer data between the storage system 24 and other storage system (not shown) that are also coupled to the RDF link 34. The storage system 24 may also include one or more disks 36a-36c, each containing a different portion of data stored on the storage device 24. Each of the disks 36a-36c may be coupled to a corresponding disk adapter unit (DA) 38a-38c that provides data to a corresponding one of the disks 36a-36c and receives data from a corresponding one of the disks 36a-36c. Note that, in some embodiments, it is possible for more than one disk to be serviced by a DA and that it is possible for more than one DA to service a disk.

The logical storage space in the storage system 24 that corresponds to the disks 36a-36c may be subdivided into a plurality of volumes or logical devices. The logical devices may or may not correspond to the physical storage space of the disks 36a-36c. Thus, for example, the disk 36a may contain a plurality of logical devices or, alternatively, a single logical device could span both of the disks 36a, 36b. The hosts 22a-22c may be configured to access any combination of logical devices independent of the location of the logical devices on the disks 36a-36c.

One or more internal logical data path(s) exist between the DA's 38a-38c, the HA's 28a-28c, the RA's 32a-32c, and the memory 26. In some embodiments, one or more internal busses and/or communication modules may be used. In some embodiments, the memory 26 may be used to facilitate data transferred between the DA's 38a-38c, the HA's 28a-28c and the RA's 32a-32c. The memory 26 may contain tasks that are to be performed by one or more of the DA's 38a-38c, the HA's 28a-28c and the RA's 32a-32c, and a cache for data fetched from one or more of the disks 36a-36c.

The storage system 24 may be provided as a stand-alone device coupled to the hosts 22a-22c as shown in FIG. 1 or, alternatively, the storage device 24 may be part of a storage area network (SAN) that includes a plurality of other storage devices as well as routers, network connections, etc. The storage device may be coupled to a SAN fabric and/or be part of a SAN fabric.

Figure 2B:
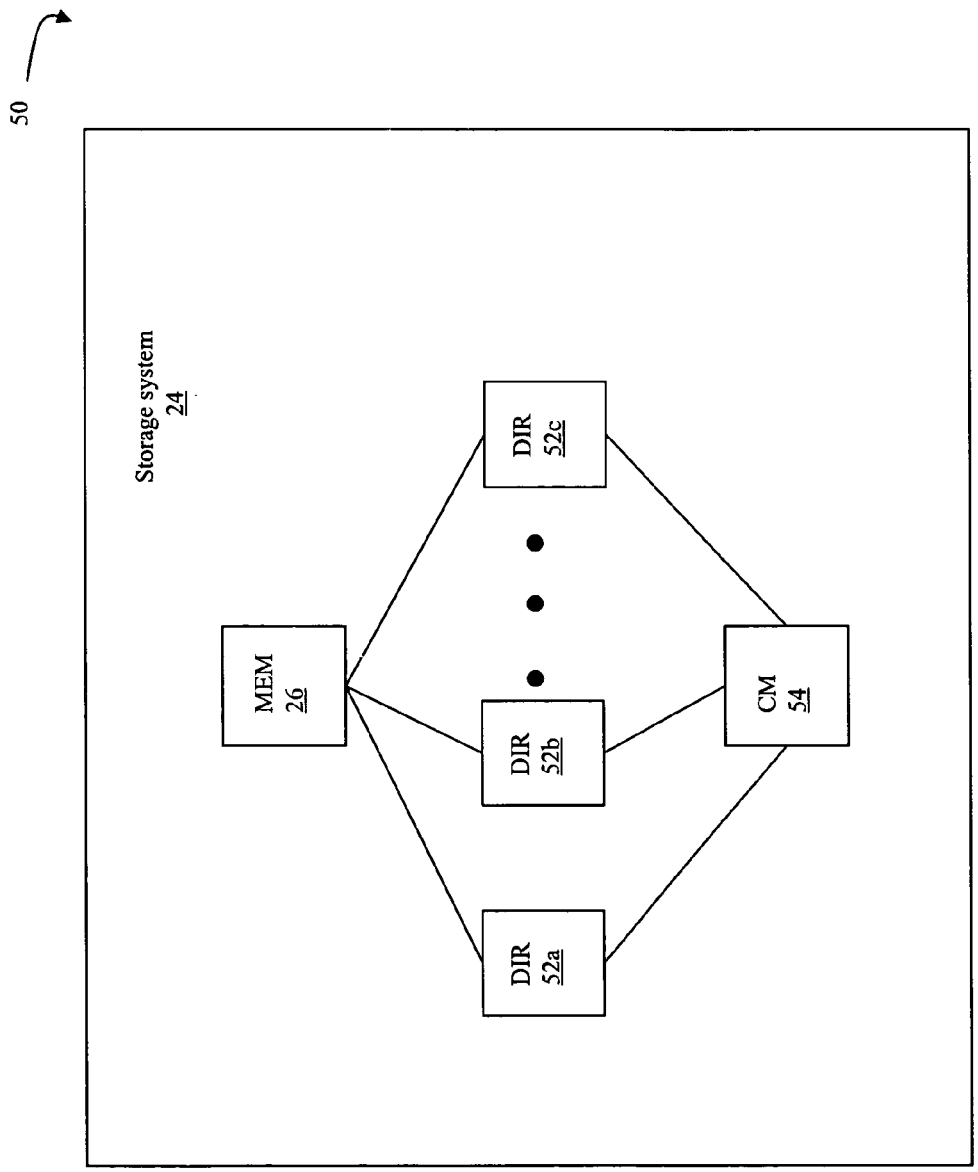
FIG. 2B is a representation of the logical internal communications between the directors and memory included in one embodiment of data storage system of FIG. 2A.

Referring now to FIG. 2B, a diagram 50 illustrates an embodiment of the storage system 24 where each of a plurality of directors 52a-52c are coupled to the memory 26. Each of the directors 52a-52c represents one of the HA's 28a-28c, RA's 32a-32c, or DA's 38a-38c. In an embodiment disclosed herein, there may be up to sixteen directors coupled to the memory 26. Of course, for other embodiments, there may be a higher or lower maximum number of directors that may be used.

The diagram 50 also shows an optional communication module (CM) 54 that provides an alternative communication path between the directors 52a-52c. Each of the directors 52a-52c may be coupled to the CM 54 so that any one of the directors 52a-52c may send a message and/or data to any other one of the directors 52a-52c without needing to go through the memory 26. The CM 54 may be implemented using conventional MUX/router technology where a sending one of the directors 52a-52c provides an appropriate address to cause a message and/or data to be received by an intended receiving one of the directors 52a-52c.

As described above, an embodiment may include a cache in the global memory portion 25b of FIG. 2A. An embodiment may include a single or multiple replacement queue arrangement in the cache. An example of an embodiment that includes a cache using multiple replacement queues is described in pending U.S. patent application Ser. No. 09/535,134, entitled "Segmenting Cache to Provide Varying Service Levels", filed Mar. 24, 2000, and assigned to EMC Corporation of Hopkinton, Mass. An example of a system with a single cache memory is described in issued U.S. Pat. No. 5,381,539, Yanai et al., entitled "System and Method for Dynamically Controlling Cache Management", and also assigned to EMC Corporation of Hopkinton, Mass.

It should be noted that in an embodiment including a multiple replacement queue arrangement, there may be separate policies, decisions and data collections for one or more of the replacement queues in accordance with restrictions as to what devices use which of the replacement queues. This may vary with each embodiment.

Figure 3:
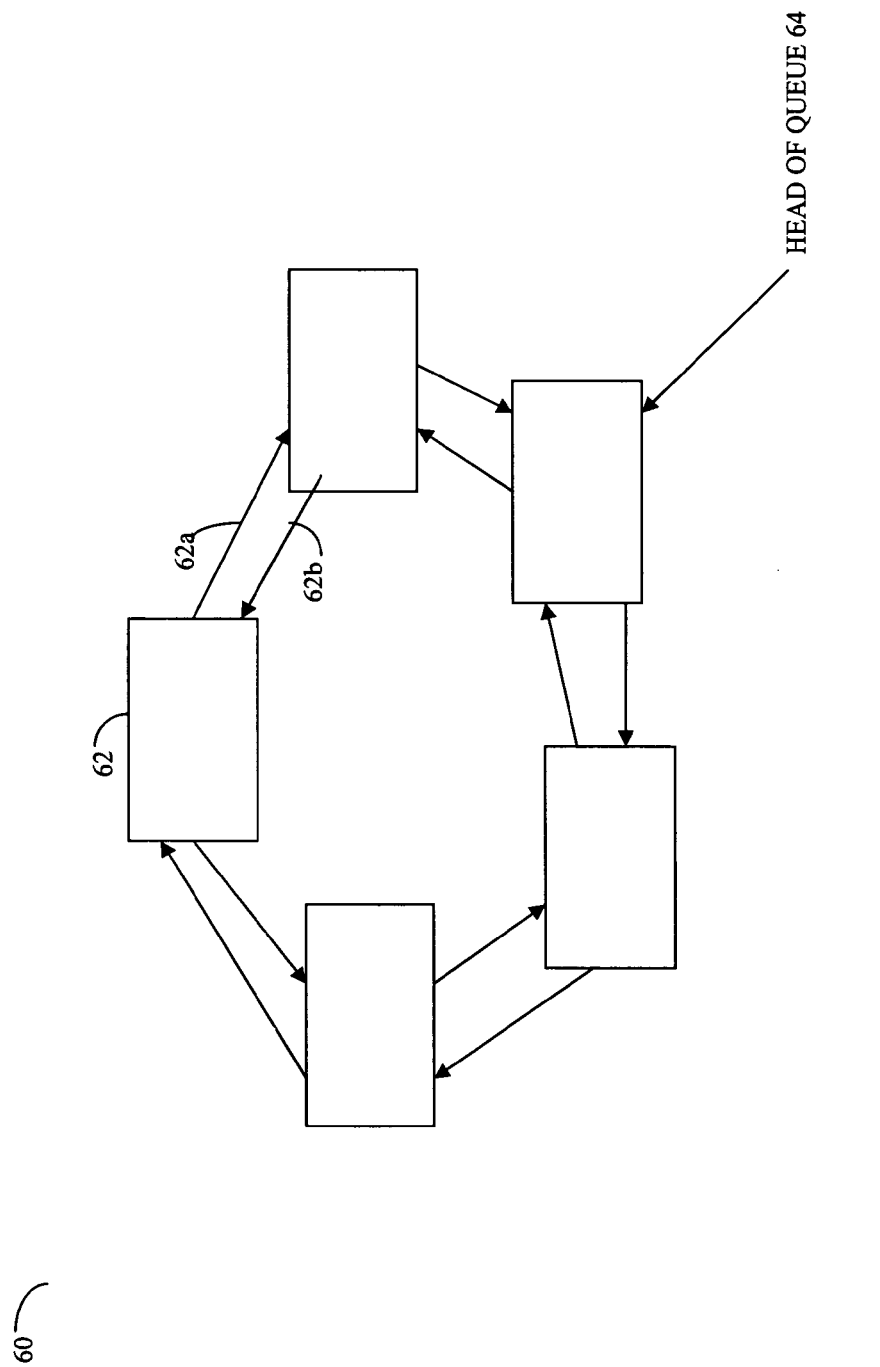
FIG. 3 is an example of an embodiment of a queue that may be used in implementing a cache.

Referring now to FIG. 3, shown is an example of an embodiment 60 of a cache arrangement as a queue. Shown in the representation 60 is a circular structure in which each of the elements, such as 62, corresponds to a cache slot. Each cache slot may correspond to a portion of memory, such as one or more memory blocks. Each memory block may correspond to, for example, a track on one of the drives shown in connection with FIG. 2A. In this representation, each of the slots are connected to other slots by forward and backward pointers, such as 62a and 62b, in a doubly linked list arrangement. Additionally, the head or beginning of the queue is designated by a head pointer 64.

It should be noted that as described herein, an embodiment may include a cache which is in the form of the foregoing queue using doubly linked list or other data structures known to those of ordinary skill in the art. The queue described herein should not be construed as a limitation to the techniques described herein. Additionally, it should be noted that an embodiment may use a least-recently-used or other technique in determining which slots remain in the cache and which ones are removed.

Figure 4:
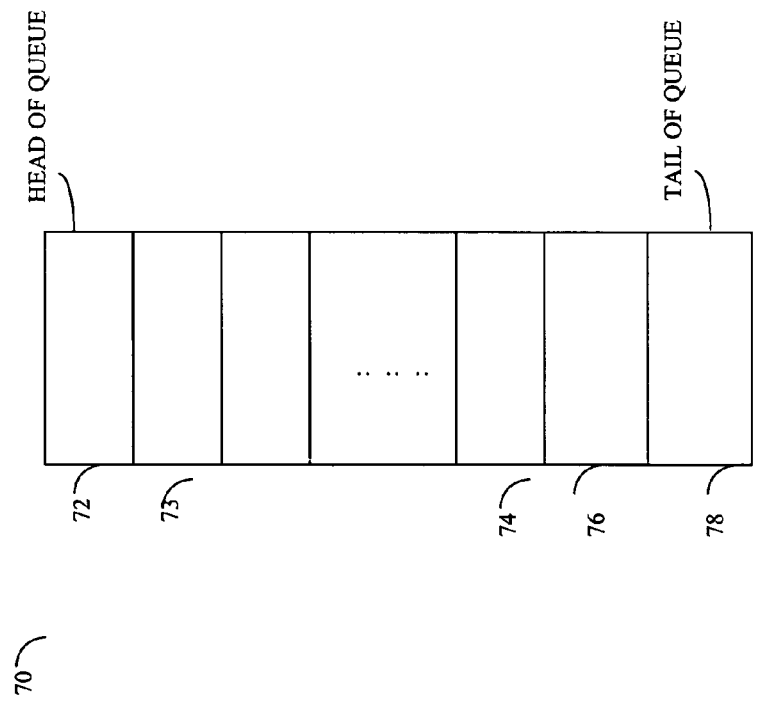
FIG. 4 is another representation of the queue of FIG. 3.

Referring now to FIG. 4, shown is an equivalent representation 70 of the previously described queue 60 in connection with FIG. 3. The representation shown in FIG. 4 is a logical equivalent of the representation shown in FIG. 3. The representation 70 of FIG. 4 logically corresponds to that in FIG. 3 such that, for example, element 72 corresponds to the beginning cache slot as noted by the head of the queue pointer 64 in connection with the previously described figure. Similarly, the last element of the queue is denoted by slot 78 which in this example is labeled also as the tail of the queue. Elements or slots may be inserted into the list at the head of the queue and exit or leave the cache at the tail of the queue. For example, when an element is deposited into the cache, it may be placed at the head of the queue in slot location denoted by 72 in connection with a read operation. Additional elements may be progressively added to the head portion or other location within the queue 72. As elements are added to the queue, subsequent elements progress toward the tail of the list. When another slot is added to the replacement queue at position 72, the slot currently at position 72 moves to that slot designated as position 73 and the newly added element falls into the position of element 72.

An element may be placed in the queue, for example, when an element is referenced in connection with an I/O operation such as a cache miss for a read operation, or in connection with processing pending write operations, for example. Once in the queue, an element progresses through the queue from the head 72 towards the tail 78 of the queue.

The foregoing queue arrangement in connection with a cache or shared memory may have drawbacks. For example, exclusive access to the queue may be implemented using a locking mechanism that only allows a single process to access the entire queue. Additionally, pointer manipulation in connection with performing management operations may also be expensive. These are described in more detail elsewhere herein.

Figure 5:
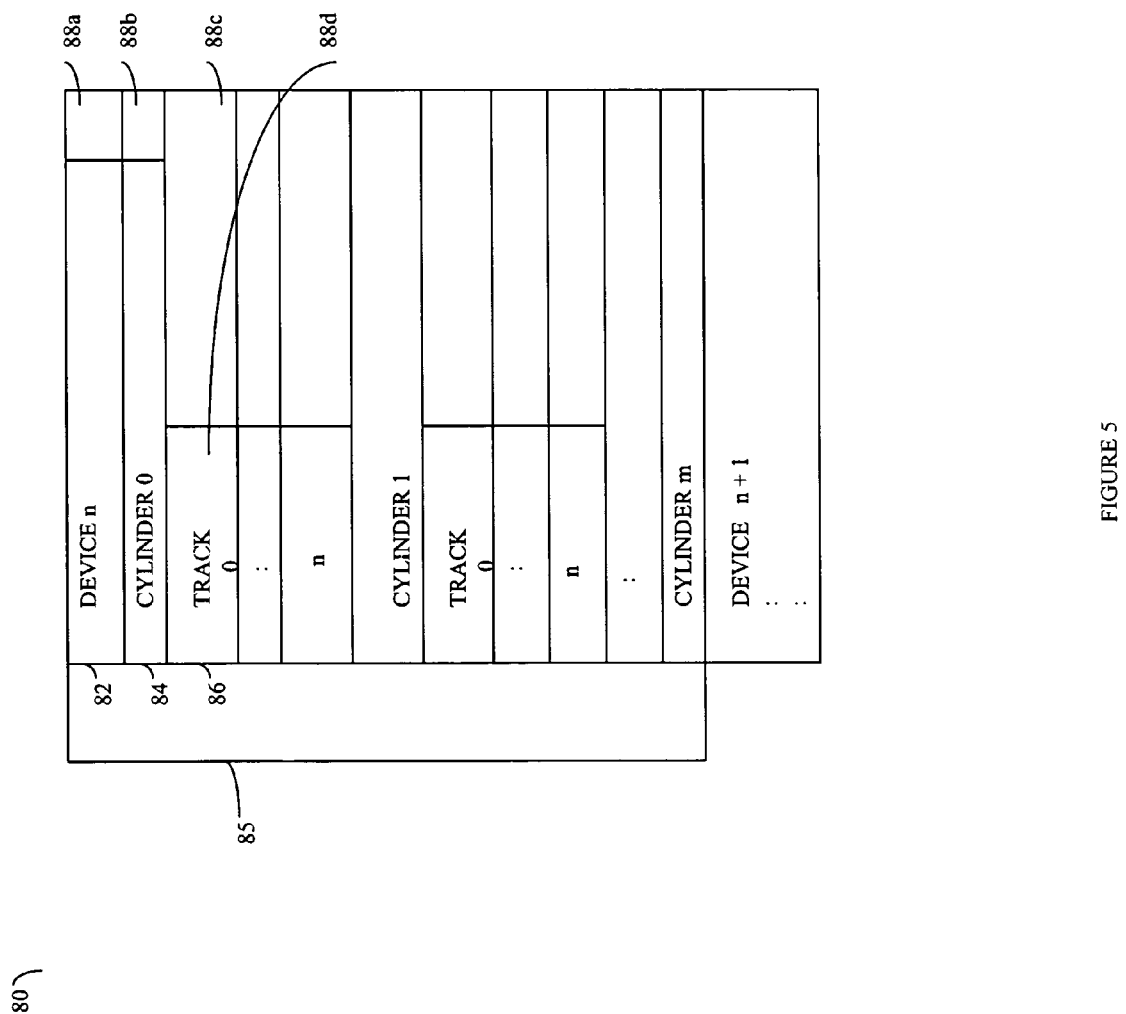
FIG. 5 is an example of an embodiment of a cache index or directory.

To indicate the data that is stored in the cache, a cache index or directory may be used. An embodiment may implement this using any one of a variety of different arrangements and structures. FIG. 5 shows one particular representation illustrating a device-by-device cache mapping.

Referring now to FIG. 5, shown is an example of a representation of a cache index/directory table. The table 80 may be organized on a device-by-device level to indicate for a particular portion of a device, is the portion in cache, and if so, where in cache is it located. An embodiment that includes devices, for example, such as disks, may include a further refinement or granularity in the table 80 corresponding to a location in cache.

The table 80 may include a hierarchical structure relative to the structure of a disk, such as cylinders and tracks on a disk. Each device, such as device n, may have a corresponding portion 85 included in the table. Each of the portions 85 may further be divided into sections in accordance with the disk structure. A portion 85 may include device header information 82, information for each cylinder 84 and for each track within each cylinder 86. For a device, a bit indicator 88*a* may indicate whether data associated with the device is stored in cache. The bit indicator 88*b* may further indicate for a particular cylinder within a device, is any data stored in the cache. Associated with each track may be a corresponding portion 88*c* indicating whether data associated with a particular track is in the cache and an associated address of where in the cache the data for a particular track may be found, for example, in connection with performing a read operation or a pending write operation. The portion 88*d* may include other information associated with a particular track, such as a valid cache address if data is stored in the cache for the particular track.

Figure 6:
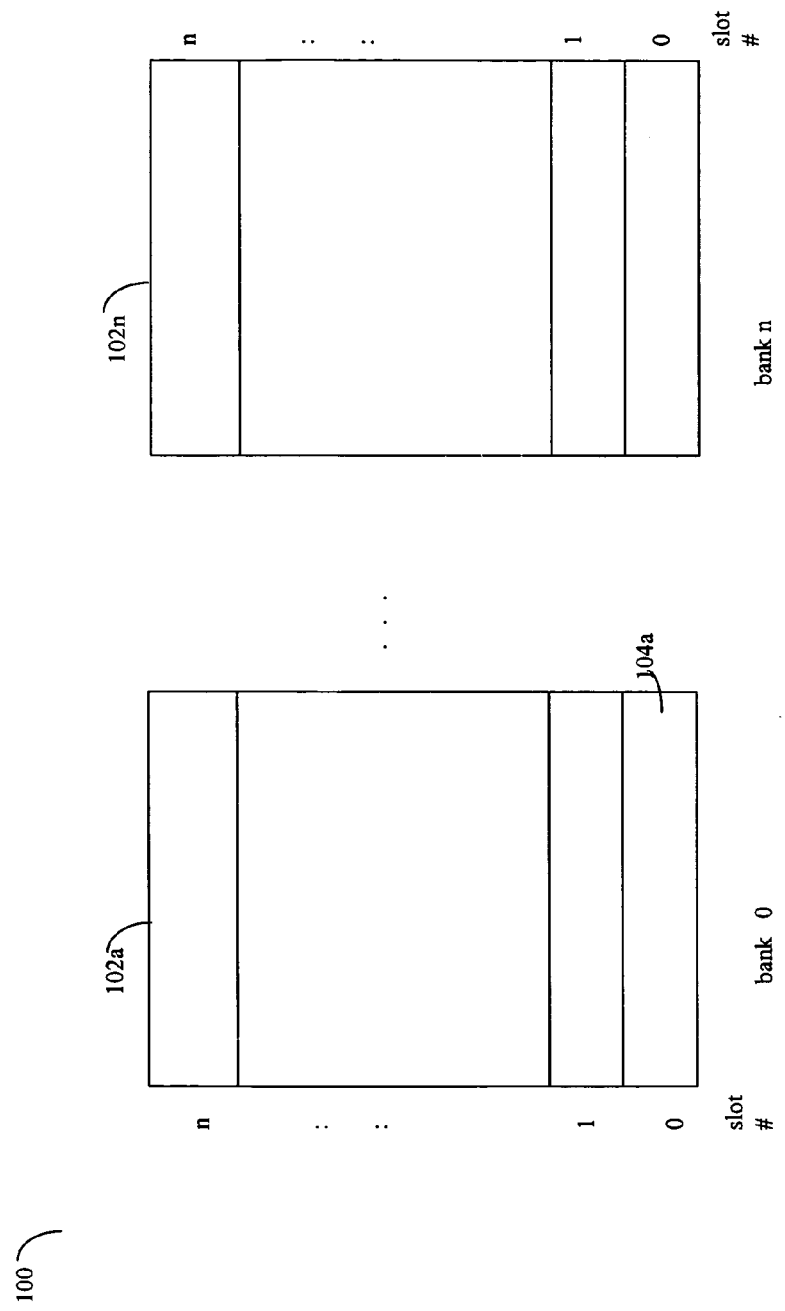
FIG. 6 is an example of an embodiment of a cache organization having a plurality of memory banks.

Referring now to FIG. 6, shown is an example of another representation of a cache in one embodiment. In this illustration, the cache 100 is organized into memory banks 102*a*-102*n* corresponding, respectively, to bank 0 through n. Each memory bank may be further divided into slots. Each memory bank, such as 102*a*, may include a control slot, such as 104*a* that includes information regarding the slots included in the respective memory bank.

It should be noted that the cache index or directory as shown in FIG. 5, for example, may be used in connection with any one or more of a variety of different cache arrangements, such as those in FIG. 3 as well as FIG. 6.

Figure 7:
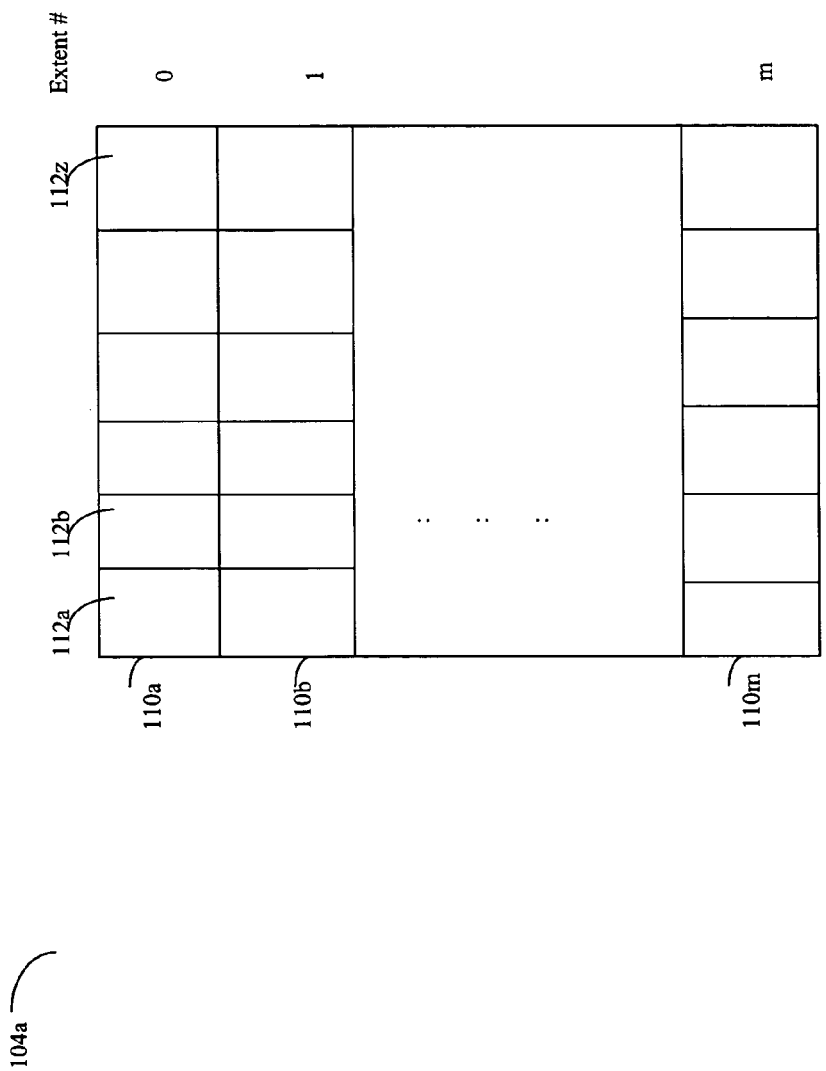
FIG. 7 is an example of an embodiment of a control slot associated with each memory bank.

Referring now to FIG. 7, shown is a more detailed description of the control slot 104*a* from FIG. 6. The control slot 104*a* may include information about the other slots in the memory bank. In this example, the control slot 104*a* may be further divided into extents or groups of tags, such as 110*a*-110*m*. Other slots in the memory bank 102*a* that includes control slot 104*a* may have a corresponding tag, such as 112*a*. In one embodiment, the tag size selected is 2 bytes or 16 bits. However, other tag sizes may be used in other embodiments. The tag may include information about the associated cache slot and is described in more detail in following paragraphs.

Each extent, such as 110*a*-110*m*, may refer to a number of tags that may vary in accordance with each embodiment. In one embodiment, the number of tags in an extent is the number of tags which may be read in a single direct memory access (DMA), for example, by a DA. Each chunk or portion may include, for example, 120 or 82 tags. Other numbers of tags may be associated with a single chunk or portion that may vary in accordance with each embodiment.

An embodiment may store the cache directory or table, cache, or portions thereof in global memory, for example, as included in FIG. 2A for a particular data storage system. Once in global memory, a DA may perform a DMA (direct memory access) and obtain a copy of a portion of the tags. The portion of the tags may be placed on another portion of memory local to the DA and utilization of this local copy is described in following paragraphs.

Figure 8:
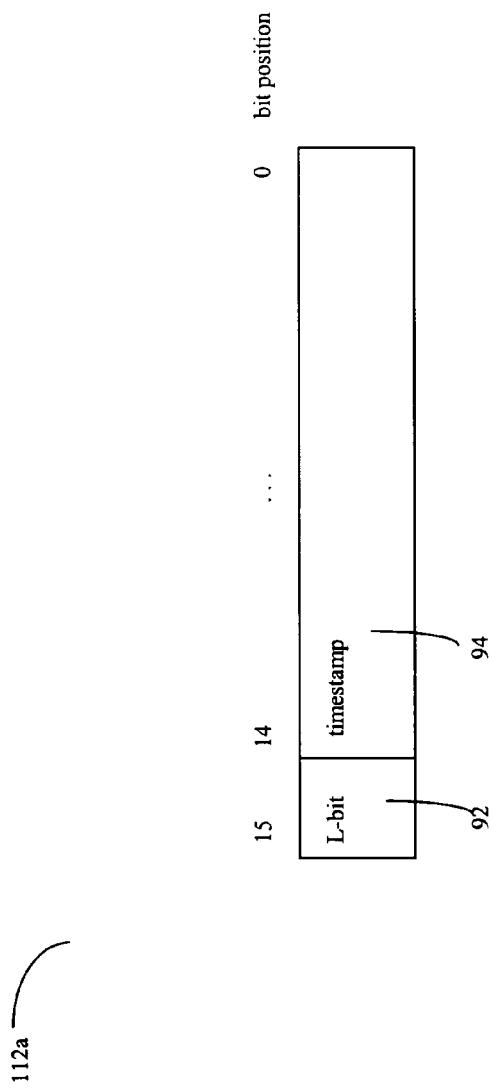
FIG. 8 is an example of a tag as included in the cache slot of FIG. 7.

Referring now to FIG. 8, shown is a more detailed representation of a tag 112*a* as included in FIG. 7. The 2 byte tag 112*a* includes an L-bit 92 and a 15 bit time stamp value 94. The L-bit, which may be the upper bit in the 2-byte tag arrangement, may be used to indicate the availability of a cache slot associated with the particular tag. This L-bit may be used in performing operations in which a processing step may be to obtain a cache slot. Associated processing operations are described in more detail elsewhere herein in following paragraphs. The time stamp value indicates, within a particular resolution, such as ½ second, when the associated slot was last used. For example, when there is a cache "hit" to a particular slot, the associated time stamp is updated with a new time stamp value.

One technique may determine which slot to use, for example, by determining the age of each slot using the associated time stamp and selecting the oldest one. Additionally, an embodiment may also use a special time stamp value to indicate that a tag corresponds to a slot which is available and includes data that is not relevant. A tag corresponding to a slot including data that is not relevant may also be referred to as a scratch slot in a pool of available slots.

Data may be stored in the cache in connection with performing data operations. Different processing steps may be performed using the cache in connection with performing different data operations. For example, when a read request is received from a host computer, a determination may be made as to whether the requested data is in the cache. If so, the data is returned. Otherwise, the data may be read from the particular data storage device, stored in the cache and then sent to the host system. A slot from the cache is determined in which to store the data. When a write operation is performed, an embodiment may store the data in the cache as a pending write which is actually written to a physical device, such as a disk, at some later point in time in accordance with system specific policies. After the data is written to the device, a cache slot may be made available for reuse. What will now be described are processing steps that may be performed in an embodiment in connection with cache management operations.

In one embodiment, data associated with a write I/O operation is first stored in cache and then later destaged or actually written out to the storage device. While the data is included in the cache but not yet written out to the device, the cache slot includes data associated with a write pending, and the slot is not available for replacement or reuse. It should be noted that a slot may be "reused" when the slot's existing data is invalidated by reuse of the slot for another subsequent purpose as described herein such as, for example, in connection with a subsequent I/O operation, or other nondata purpose. In the tag-based cache embodiment, a slot may be indicated as unavailable for reuse or replacement when the L-bit is set. In an embodiment using the cache structure of FIG. 3, for example, a slot that is unavailable for reuse or replacement may be removed from the cache chain structure. Once the data included in the cache slot has been destaged, an indicator in the cache slot may be set to indicate the slot as available for reuse, as described elsewhere herein in connection with the L-bit being cleared. When an embodiment makes a request for a cache slot such as in connection with processing a new I/O operation, an embodiment may select a cache slot from those indicated as available, such as selecting from those cache slots having an L-bit=0.

In one embodiment using the tag-based cache, a cache slot may be a candidate for reuse if the L-bit=0. Candidates (L-bit=0) may also be characterized as including meaningful user data, or, alternatively, nondata. In one embodiment, nondata candidate slots are not associated with user data on a data storage device and may be designated as a "free" slot with a unique or special timestamp value, such as zero. Candidate cache slots which are designated as data cache slots associated with user data on a data storage device may have a non-zero timestamp value to differentiate available data cache slots from the nondata available cache slots. Any cache slot have an L-bit=1 is not available for use or is otherwise not a current candidate for reuse.

An embodiment may use any one or more different criteria in connection with selection of an available cache slot. For example, an indicator, such as an L-bit setting, may be used in connection with a time stamp value to select a particular cache slot. Additionally, an embodiment may select a particular cache slot for use in accordance with whether the slot has been designated as a data cache slot or a nondata cache slot. Such an indication may be made using a bit flag or other indicator in a cache slot. For example, after data is destaged from a cache slot including data for a pending write, the cache slot may still include user data that can be used in connection with subsequent I/O operations. Even though the cache slot may be indicated as available for use, the data in the cache slot may be reused for a subsequent I/O operation. Thus, an embodiment may select a cache slot that does not contain data (or includes nondata) prior to selecting an available cache slot that includes data. Accordingly, an embodiment may have different policies in connection with selecting a particular cache slot from those possible cache slot candidates indicated as free or available for use. An embodiment may preferably select a slot which is both indicated as available, such as in accordance with an L-bit setting, and additionally is a nondata cache slot, as may be indicated using a unique or special timestamp value.

It should be noted that an embodiment may use cache slots for nondata or data uses that may vary in accordance with each embodiment. For example, in one embodiment, nondata cache slots may be used as scratch cache slots, for testing, in RAID processing, XRC (Extended Remote Copy), and the like. Such uses of cache slots may be characterized as nondata because the cache slots do not include valid user data associated with a data storage device that may be used in connection with subsequent I/O operations. When the nondata use of a cache slot completes, the slot does not contain any valid useful data for subsequent I/O operations. For example, in RAID processing, a cache slot includes parity information. Once such information is written out to a device, the data included in the cache slot is not associated with, for example, a valid portion of user data such as track of user data on a data storage device. In XRC processing, the cache slot may be used to store host commands. After the commands are processed, the cache slot does not include data that may be used in connection with subsequent I/O operations. Such cache slots as used in XRC and RAID operations are examples of nondata cache slots such that after the XRC and RAID operations are complete, the data storage system does not have any subsequent use for the information in the nondata cache slot(s).

An embodiment may also use one or more different cache management structures in addition to the shared cache that may be used by one or more directors as described herein in a data storage system. In one embodiment, each director may also manage and maintain for its own use a stack of private cache slots. It should be noted that the shared cache structure may be, for example, the cache structure previously described in connection with FIGS. 3 and 4 as well as the tag-based cache also described herein. In addition to the foregoing shared cache, each director may maintain what may be characterized as a private cache structure. In the embodiment that will be described in following paragraphs, the private cache structure used by each director is the stack of private cache slot pointers. The cache slots included in the private cache maintained by each director may include only nondata cache slots.

In the tag-based cache embodiment described in following paragraphs, the L-bit of a cache slot with a value of 1 indicates that the cache slot is not available to be allocated as a new slot. Cache slots may be designated as "unavailable" for one or more reasons that may vary with each embodiment. In the embodiment described herein, cache slots included in the private cache maintained by each director are considered "unavailable" and have the L-bit=1. Cache slots having an L-bit=1 may indicate an unavailable status for other reasons such as, for example, write pending data that has not been written out to a device.

Figure 9:
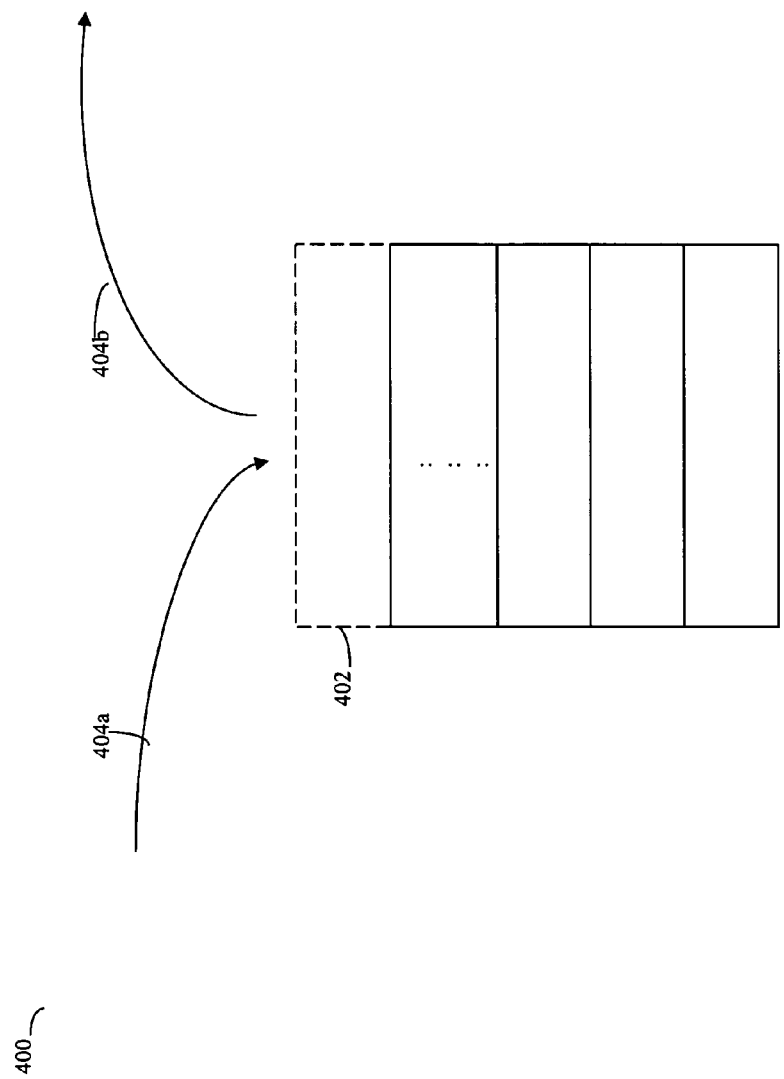
FIG. 9 is an example of an embodiment of a private stack structure as may be used by each director.

Referring now to FIG. 9, shown is an example of an embodiment of a data structure 400 that may be used in connection with implementing a director's private cache. As illustrated in 400, an embodiment may use a stack data structure of private cache slots. The representation 400 includes an illustration of a stack data structure as known to those of ordinary skill in the art. Entries are pushed or placed on top of the stack such as entry 402 as indicated by arrow 404a. An entry such as entry 402 may be removed as indicated by arrow 404b by popping the top entry 402 from the stack.

In one embodiment, the stack structure 400 may be characterized as a logical representation of the private slot pointers maintained by each of the directors. A slot may be indicated as private in any one of a variety of different ways that may vary with each cache implementation. For example, each cache slot may indicated as private by setting a flag included in the flag word of the cache slot and associated control slot in the tag-based cache implementation described elsewhere herein. With the tag-based cache, those cache slots designated as private for each director may be included within the same physical and/or logical memory unit(s) as those cache slots within the shared cache for use by all of the directors with a particular indicator for which of those slots are private versus non private for use by a particular director. Additionally, an embodiment of the tag-based cache may include an identifier indicating which director or processor has designated this particular cache slot as private for its own use. The particular use of the director identifier and the private flag will be described in connection with processing steps in following paragraphs. In connection with the queue cache structure of FIGS. 3 and 4, pointers may be used to include each of the cache slots as an entry in the appropriate shared or private cache. Thus, in an embodiment using a linked list queue structure for the private and shared caches, a particular cache slot may be indicated as private for a particular director or as nonprivate for use by one or more directors in accordance with the particular data structure into which the cache slot is included utilizing, for example, pointers.

It should be noted that the foregoing are examples of data structures that may be used in connection with implementing the techniques described herein. One of ordinary skill in the art will appreciate that any one of a variety of different data structures as well as indicators may be used in connection with implementing the techniques described herein.

In an embodiment using the private stack structure per director and the shared cache, when a director determines it is able to make a slot free and available as a candidate for reuse, the director may take steps to possibly return the cache slot to its private stack rather than indicating the slot as a candidate for reuse by all directors. The director attempts to push the cache slot's pointer to the director's private stack. If the director is unable to successfully push a nondata cache slot to its private stack, or if a "sanity" check processing fails (i.e., the cache slot's flags are different than expected indicating an error condition needing recovery processing), the director then makes the slot available for reuse by other directors. In other words, an individual director keeps within its private stack a nondata cache slot if possible. In other instances, the director may return the cache slot for reuse to the shared cache for reuse by all directors.

It should be noted that a director may be unable to push a cache slot to its private stack, for example, if the stack is full. In one embodiment, each director maintains a stack of a predetermined size in accordance with the particular traffic and I/O operations tuned in accordance with a particular system. When the maximum number of stack entries has been exceeded, the director is unable to store any further cache slots within its private stack.

When there is a request to obtain a slot for storing data or nondata, a director looking for the cache slot first checks its private stack to determine if there are any cache slot entries within its stack. If so, the director pops the top entry from its stack for use. Otherwise, if there are no entries remaining in the director's private stack, the director attempts to locate and obtain an available cache slot from the shared cache using normal or regular cache management processing.

The particular size of the private cache structure of each director, such as the size of the stack, may be vary in accordance with the number and type of I/O operations, and the like, in an embodiment. In one embodiment, for example, the private stack maintained by each director may have 10 or 16 entries.

Figure 10:
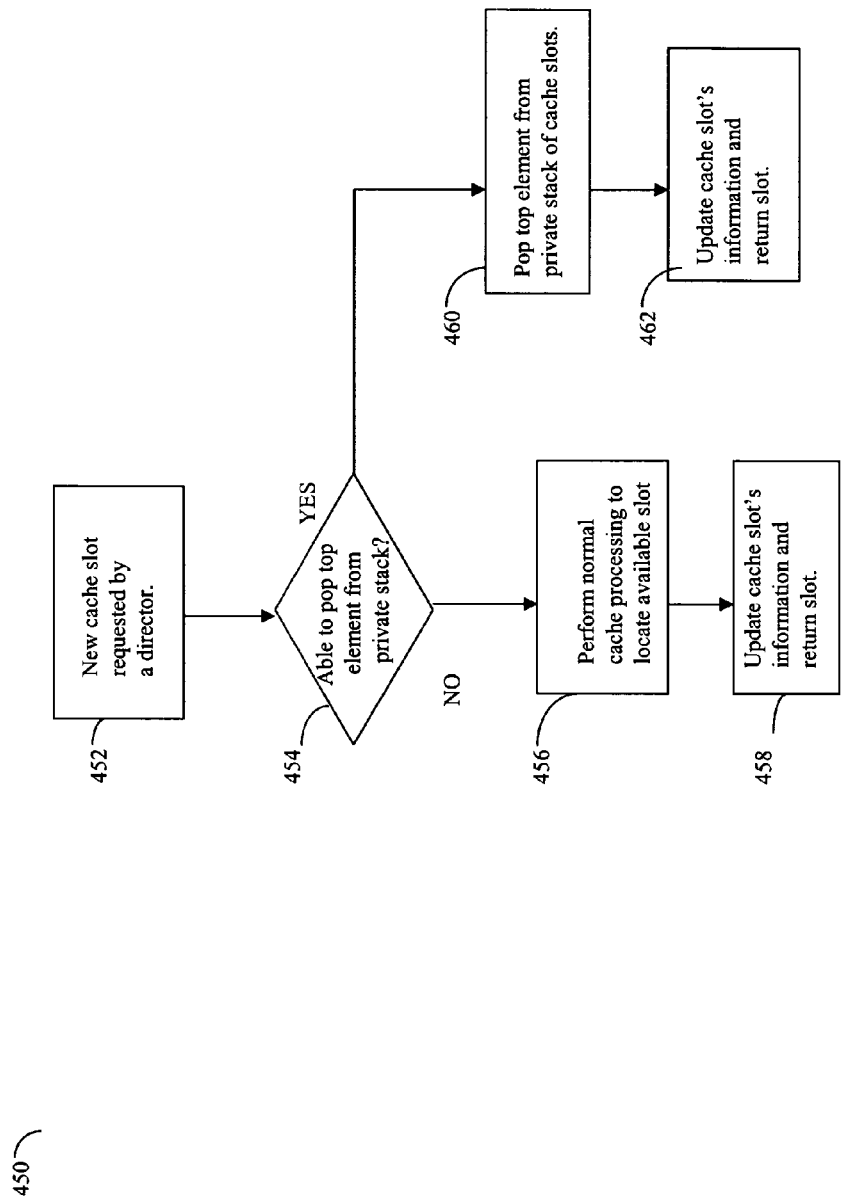
FIG. 10 is a flowchart of processing steps in one embodiment for obtaining a new cache slot.

Referring now to FIG. 10, shown is a flowchart 450 summarizing the processing steps that may be used in one embodiment in connection with processing a request for a cache slot by a particular director. The steps of 450 may be performed by each director when a new cache slot is needed such as, for example, in connection with storing data for an I/O operation. At step 452, a director determines that a new cache slot is needed such as, for example, in connection with using a cache slot for a write or read operation (use as a data cache slot), or in connection with nondata operations and uses, such as for XRC and RAID operations, use as a scratch cache slot, and the like. At step 454, an attempt is made to pop or remove a top element from the director's private stack. It should be noted that step 454 may be unsuccessful for any one or more reasons that may vary in accordance with an embodiment such as, for example, the stack may be empty, the director may not be able to obtain a slot lock, or other unexpected conditions indicating an error (such as a slot not including properly set indicators designating this slot as "private").

If step 454 is successful, processing proceeds to step 460 where the director pops the top element from its private stack of cache slots. At step 462, the cache slot removed from the private cache has its information updated as needed to maintain cache coherency and also in accordance with the particular use for which the new slot is being requested. The steps performed in connection with updating the cache slot vary in accordance with embodiment. For example, in one embodiment, the cache slot information update may include updating the cache slot's flags and other fields in accordance with whether the cache slot is being used as a data or nondata cache slot, updating shared cache management structures if the cache slot is being removed from the private stack and included in the shared cache, and the like. For example, if the new cache slot is associated with a write request and write pending data, the cache slot may not be included in the shared cache and may be initially indicated as unavailable (L-bit=1 in tag-based cache; not included in the cache structure for queue-based cache of FIG. 3). If the new cache slot is associated with a read request, the cache slot may be indicated as available (L-bit=0 in tag-based cache; included in the queue-based cache structure of FIG. 3) and also including valid user data (non-zero timestamp for a data cache slot). The cache slot is then returned to the caller of flowchart 450 processing as the new cache slot for use.

If, at step 454, the pop is unsuccessful, control proceeds to step 456 to perform normal or regular processing that may otherwise be performed in an embodiment to select an available slot candidate. In one embodiment, this may include selecting a candidate from those available slots (L-bit=0) with preference for selection to those nondata or free cache slots (zero timestamp) from the shared cache. Control proceeds to step 458 where the cache slot selected has its slot information updated as needed to maintain cache coherency and in accordance with the use for which the cache slot is being requested. Processing performed at step 458 in connection with maintaining cache coherency and updating the cache slot and related structures is similar to that as described in connection with step 462. The updated slot is then returned as part of step 458 processing. It should be noted that processing of step 456 may include what may be characterized as "normal" cache processing to select a cache slot from the shared cache in connection with an embodiment that does not utilize private caches for directors. Processing associated with step 456 that may be included in one embodiment is described elsewhere herein in more detail in connection with FIGS. 17-21.

In the foregoing processing steps of FIG. 10, the director requesting a cache slot first looks to its stack of private slots. If unable to obtain one from its private cache, the director proceeds with what may be characterized as "normal cache processing" to obtain an available cache slot from the shared cache that may be accessed by multiple directors.

Figure 11:
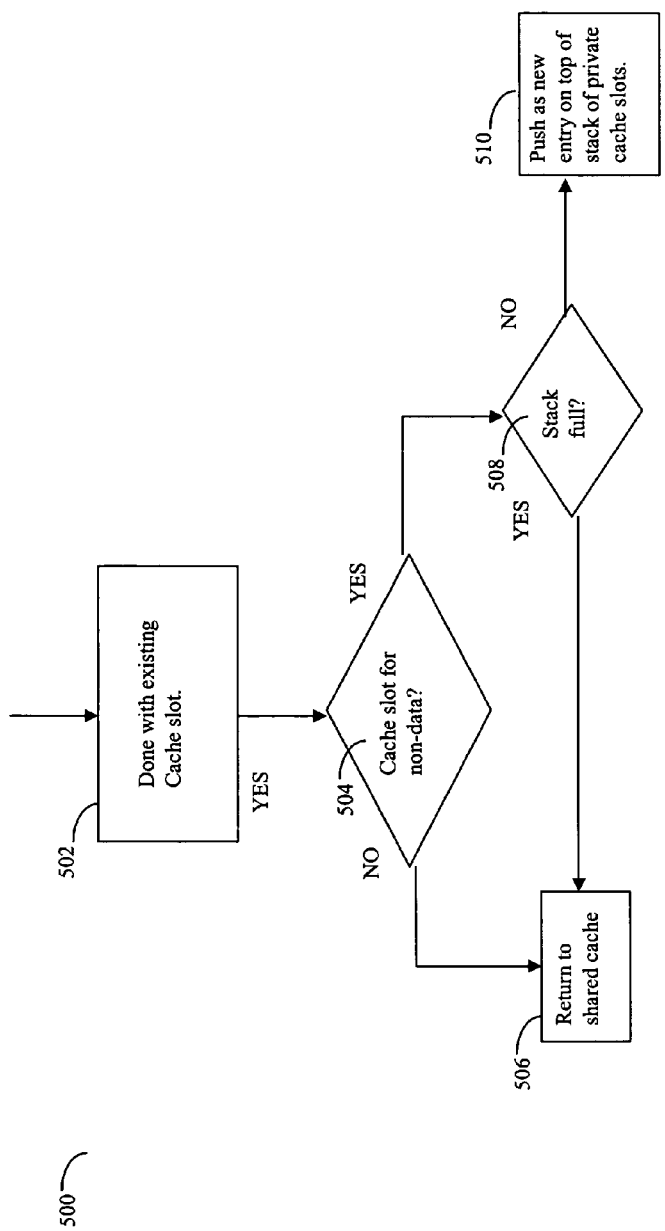
FIG. 11 is a flowchart of processing steps in one embodiment for handling a cache slot when a director determines that the cache slot may be reused.

Referring now to FIG. 11, shown is a flowchart 500 of processing steps that may be performed in an embodiment in connection with returning a cache slot for reuse to one of the existing logical cache structures. It should be noted that the processing steps of flowchart 500 of FIG. 11 summarize the processing steps previously described in connection with returning a slot to either the private stack of cache slots for reuse by a single director, or the shared cache used by multiple directors.

At step 502, a director has completed processing an existing cache slot and the existing cache slot may now be reused. In one embodiment, a cache slot may be returned to either the director's private cache or the shared cache for reuse in connection with any one or more different processing operations. For example, cache slot return processing as described in connection with FIG. 11 may be performed as part of a garbage collection process, post processing performed when an operation (such as a destaging operation) is complete, and the like. Once a director has completed processing of an existing cache slot, control proceeds to step 504 where a determination is made as to whether the cache slot is indicated as a data or nondata cache slot. If a determination is made that the cache slot is not a nondata cache slot, control proceeds to step 506 where the cache slot is returned to the shared cache. In the embodiment described herein, processing at step 506 includes updating the cache slot's information as needed to maintain cache coherency. For example, this may include updating the cache slot's information to indicate this slot as an available (L-bit=0) cache slot including data (non-zero timestamp).

If at step 504 it is determined that the cache slot to be returned has been designated as a nondata cache slot, control proceeds to step 508 where a determination is made as to whether the director's stack of private cache slots available for use is full. If the stack is full, control proceeds from step 508 to step 506 processing. Step 506 processing for this particular slot includes updating the cache slot's information to indicate that this cache slot is available (L-bit=0) and free including nondata (timestamp=0) so that the cache slot may be reused by any of the directors in the data storage system. Otherwise, if the existing directors' stack is not full, control proceeds to step 510 where the cache slot determined at step 502 is pushed to the top of the stack of private cache slots for that particular director. At step 510, the cache slot's information is also updated as needed to maintain cache coherency including, for example, indicating the slot as a private slot (L-bit=1, private flag or indicator set, zero timestamp indicating a nondata slot).

It should be noted that an embodiment may also test for different additional conditions in step 508 of FIG. 11 in determining whether a cache slot is added as to a director's private stack. For example, in one embodiment, a cache slot included in a memory unit indicated as disabled may not be added to the private stack. A logical or physical memory unit may be indicated as disabled, using a hardware setting for example, if one or more physical memory units are in the process of being removed. Setting a disable option or bit for the memory unit may be performed as a step prior to removal. Prior to physically removing a memory unit, processing steps may also be performed to remove or "drain" all cache slots included in this unit from each director's private stack. This may be done by returning to the shared cache each cache slot of the disabled unit to be removed that is included in a director's private stack. Prior to selecting a cache slot candidate for use, a director may first check to ensure that the cache slot is not included in a memory unit designated as disabled.

In the event that one of the directors fails with a non-empty private stack, the cache slots included in the failed director's private stack may be released. The detection of a failed director or processor may be performed by another director. In order to determine whether a particular director is dead or alive, an embodiment may use any one or more of a variety of different techniques. In one embodiment, each of the directors, including the DAs, and other directors within a data storage system, may update a particular location in global memory at predetermined time intervals. The foregoing may be characterized as a heartbeat of each of the different directors. In the event that a heartbeat is not detected for a first director as expected by a second director, the second director may conclude that the first director is in a dead state.

Referring now to FIG. 12, shown is an example representation 590 of a heartbeat table that may be stored in global memory on a data storage system. Each director, including DAs, RAs, and the like, may be associated with a unique row in the representation 590 as indicated by the director identifier in column 92. Each director may be expected to report or update the time stamp value in column 596 at each particular interval as indicated by column 594. The repeated recordation and reporting of the time stamp in column 596 at each of the particular time period intervals as indicated by column 594 may be characterized as the heartbeat of the associated director as indicated in column 592. In the event that the current time advances past the last time stamp value plus the interval for a first director, other directors in this embodiment assume that the first director is in the dead state. In addition to each director being expected to update or write its corresponding time stamp value into the global memory at pre-determined time intervals, each director also reads the values in the representation 590 in order to determine which other director may have entered the dead state. For example, as part of normal processing, each director may check the heartbeat status of every other director once a second, or other time period that may vary with each embodiment. In the event that a particular director detects that another director is dead because a heartbeat has not been received within an expected time period, that particular director may then update other values as may be maintained within the global memory to indicate that this particular director is now dead rather than alive. An embodiment may also include a status of which directors have been determined by another to be in the dead state.

In the event that each of the directors has the same time interval or heartbeat period within which a time stamp update is expected, the table 590 may omit the intervals 94.

It should be noted that, as will be appreciated by one of ordinary skill in the art, access to the heartbeat table or other structure is synchronized since it is accessed by multiple directors for modification. Any one of a variety of techniques that may vary with each embodiment may be used in performed this synchronization.

At predetermined time intervals, each director may update its own heartbeat information in the foregoing heartbeat table as well as read the heartbeat information of other directors to determine if any director is in a dead or unavailable state and return any of the dead director's private cache slot(s) to the shared cache. Once a director has been characterized as "dead", the cache slots may be scanned to locate the dead director's private slots and also to locate and release other slots that were in use by the dead director.

Figure 13:
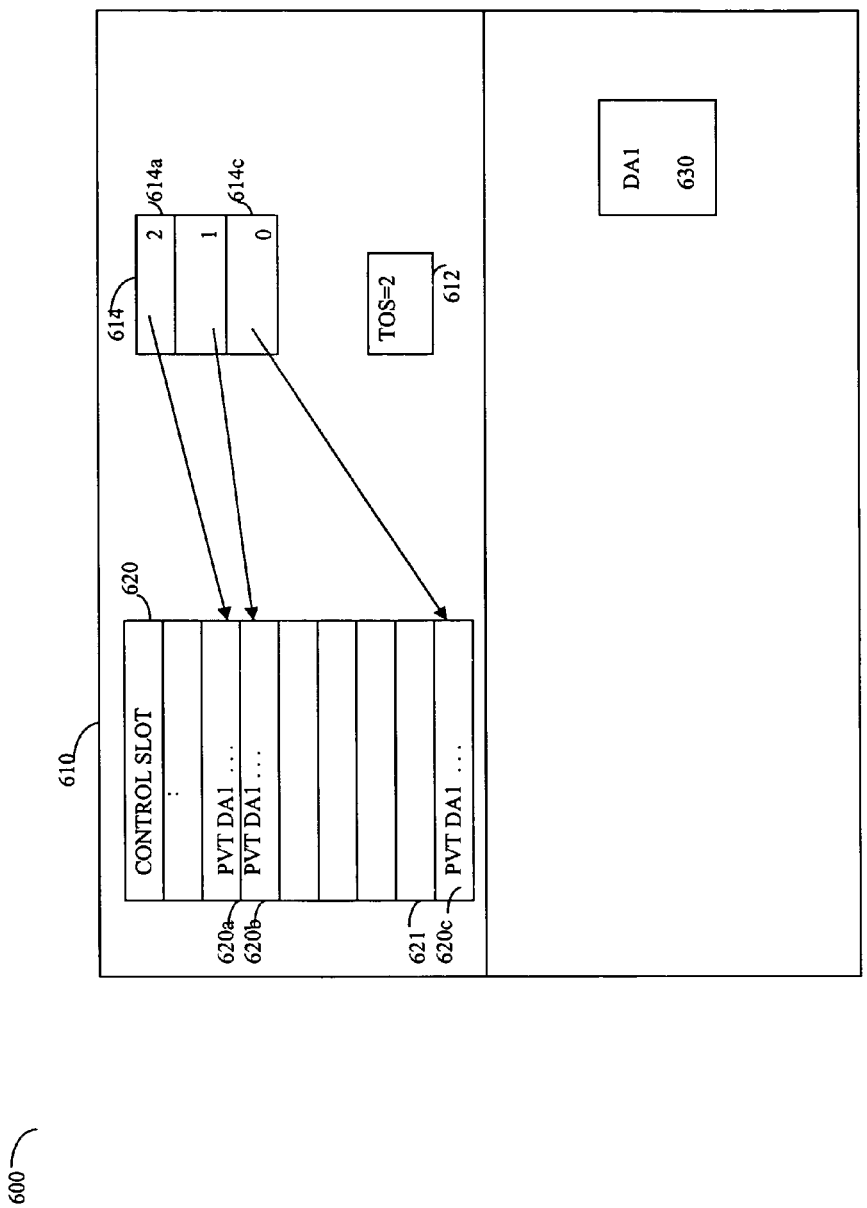
FIGS. 13 and 14 are example illustrations of embodiments of cache structures.

Referring now to FIG. 13, shown is an illustration 600 of cache structures in one embodiment. The illustration 600 shows only some elements of the data storage system without interconnections as included in FIGS. 2A and 2B for the purposes of illustrating the caching technique. Included in 600 is a global memory 610, a tag-based cache structure 620 including the cache slots, a private stack 614 for the director DA1 630, and TOS (top of stack indicator) for 614. The particulars of 600 may be characterized as representing a snapshot of the state of the caching structures at a point in time. The structure 620 includes a control slot and multiple cache slots, such as 620a-620c. The private stack 614 in this example is an array of pointers to cache slots for DA1. The TOS indicator 612 is 2 indicating the current top of the stack. Each entry in 614, such as 614a, identifies a corresponding entry in the cache structure 620 which is included in the private stack for the director DA1. Each cache slot included in the private stack 614, such as 620a, may include an indicator designating that this cache slot is PRIVATE and for a specific director, such as DA1. In one embodiment, the PRIVATE indicator may be a bit included in a flag word and the director identifier, such as DA1, may be an alphanumeric or other unique identifier designating an owner director. The director identifier and PRIVATE designation may be stored in a portion of the cache slot and/or also included the control slot. As also described herein, a slot included in a private cache has the L-bit=1. Note that additional details about a tag-based cache are described elsewhere herein.

It should be noted that cache slots of 620 may be designated as being in one or more private stacks and also included in the shared cache available for use by all directors. Structure 620 may logically represent one or more physical memory units. In this example, all the structures are shown as being included in global memory. However, an embodiment may alternatively include some or all of the structures used by each director using other memory, such as may be local to a director.

In connection with accessing shared resources, such as portions of global memory including the cache structures described herein, even though not included in some processing steps herein, it will be appreciated by one of ordinary skill in the art that any one or more different techniques may be used to synchronize access among multiple directors. For example, an embodiment may have a per slot lock that is acquired and set prior to a director accessing a cache slot in a tag-based cache implementation. The locks are released when any necessary cache slot updates have completed. The particular techniques may vary with embodiment.

Figure 14:
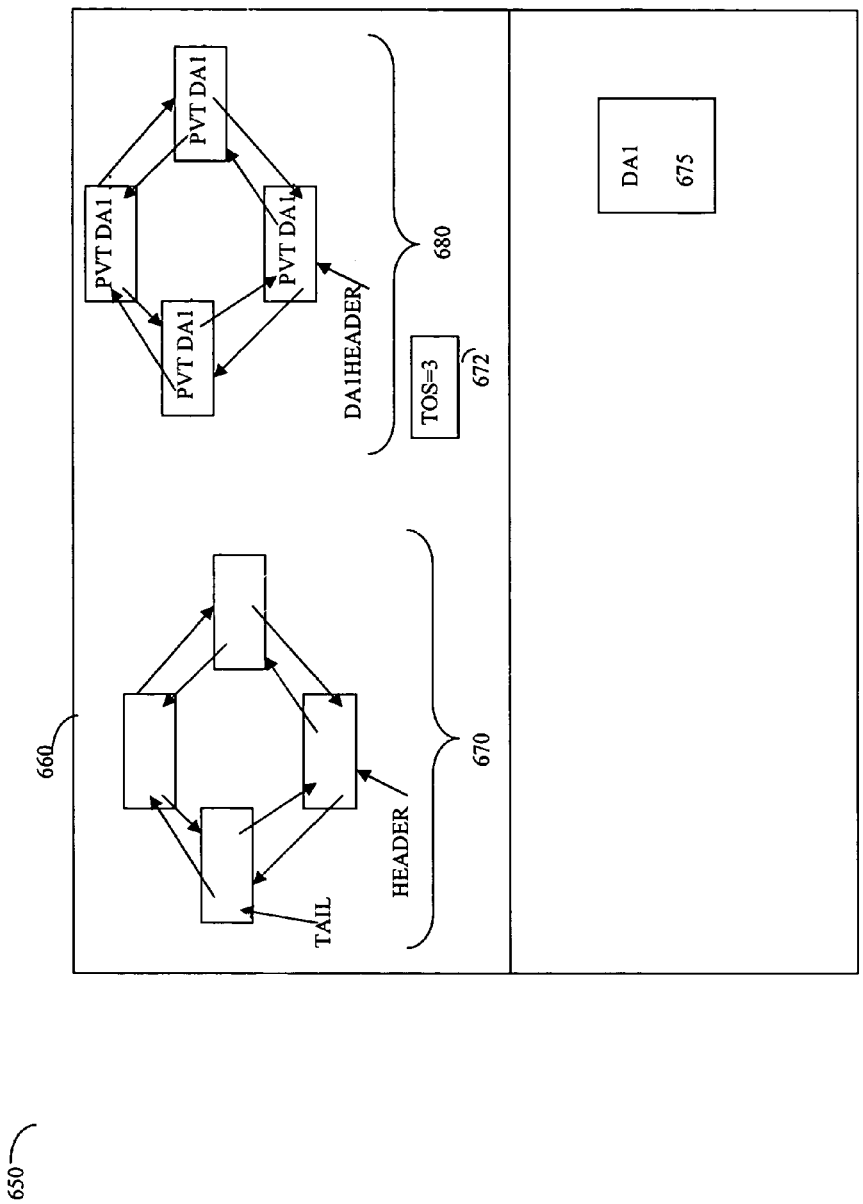

Referring now to FIG. 14, shown is an illustration 650 of cache structures in another embodiment. The global memory 660 includes a cache structure 670, a private stack structure 680 for director DA1 675, and a TOS 672 (similar to element 612 of FIG. 13). In this embodiment, those cache slots that are included in the private cache 680 may be connected by pointers as illustrated separate from those included in the structure 670. In this example, all the structures are shown as being included in global memory. However, an embodiment may alternatively include some or all of the structures used by each director using other memory, such as may be local to a director.

What will now be described are more detailed processing steps in connection with the pop and push operations of, respectively, FIGS. 10 and 11.

Figure 15:
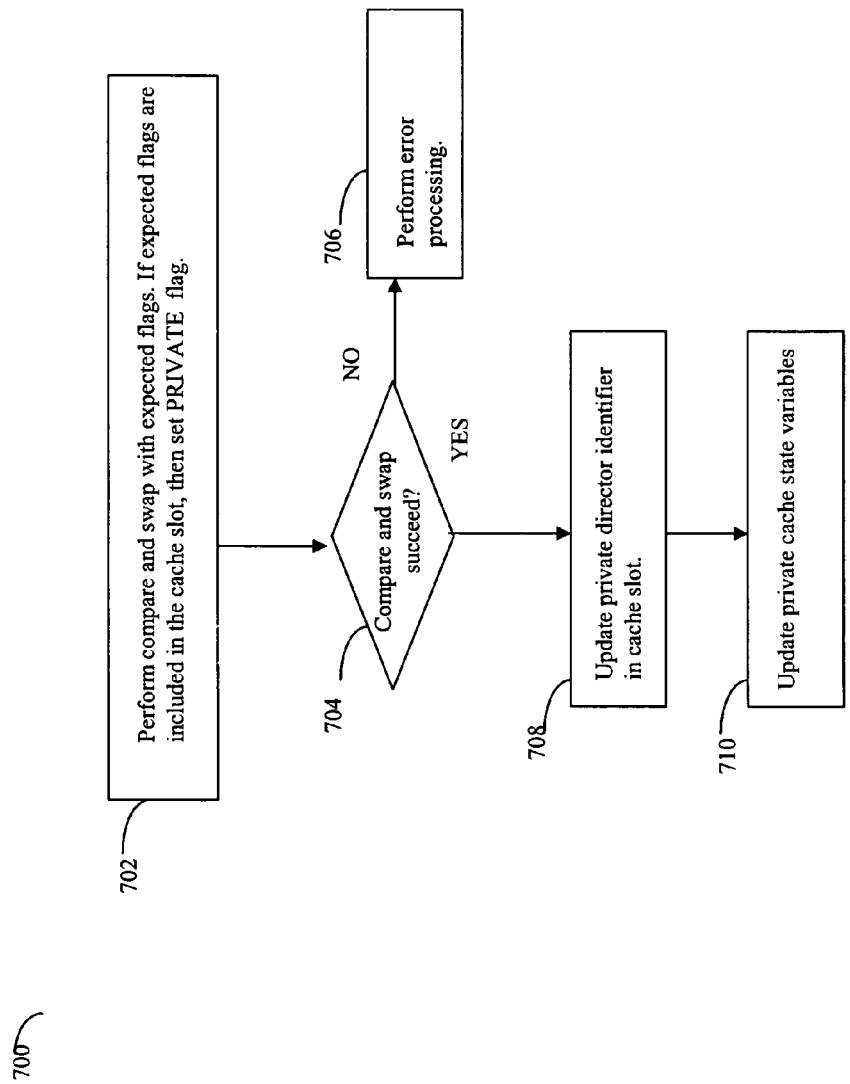
FIG. 15 is a flowchart of more detailed processing steps in one embodiment for performing a push operation.

Referring now to FIG. 15, shown is a flowchart 700 of processing steps that may be performed in an embodiment as part of a push operation for pushing an element on the private stack of a director. The processing steps of FIG. 15 may be performed by each director using code included in, and executed by, each director. As known to those of ordinary skill in the art, the code may be stored in any one of a variety of different forms readable by a processor such as a processor of the director.

Prior to beginning execution of flowchart 700, it is assumed that any necessary lock(s) for the cache slot being pushed have been acquired and accordingly indicate the appropriate state. Additionally, the cache slot being pushed on the private stack is a nondata cache slot being returned for reuse. Thus, the director executing the steps of 700 has already acquired the cache slot and indicated the cache slot as unavailable for use by other directors, such as by setting the L-bit to 1. At step 702, a compare and swap instruction may be performed with the expected flags. If the flag word of the cache slot to be pushed has the expected flag word, it means that another director has not updated the cache slot since the expected flag word has last been obtained. This may be performed as a "sanity check" to detect the possible race condition that may occur when a cache slot is being accessed by multiple directors. An example of a particular race condition is described elsewhere herein. As also described elsewhere herein, the compare and swap in one embodiment may be used to perform a conditional update if a condition is true. In step 702, the private cache slot is indicated as private only if the flag word of the cache slot is the expected set of flag conditions. At step 704, a determination is made as to whether the compare and swap succeeded. If not, control proceeds to step 706 where error processing may be performed. The particular error processing may vary with each embodiment. Otherwise, if step 704 evaluates to yes, control proceeds to step 708 where the cache slot's director identifier is updated. At step 710, any private cache state variables, such as pointers, top of stack counters, and the like, may be updated.

Figure 16:
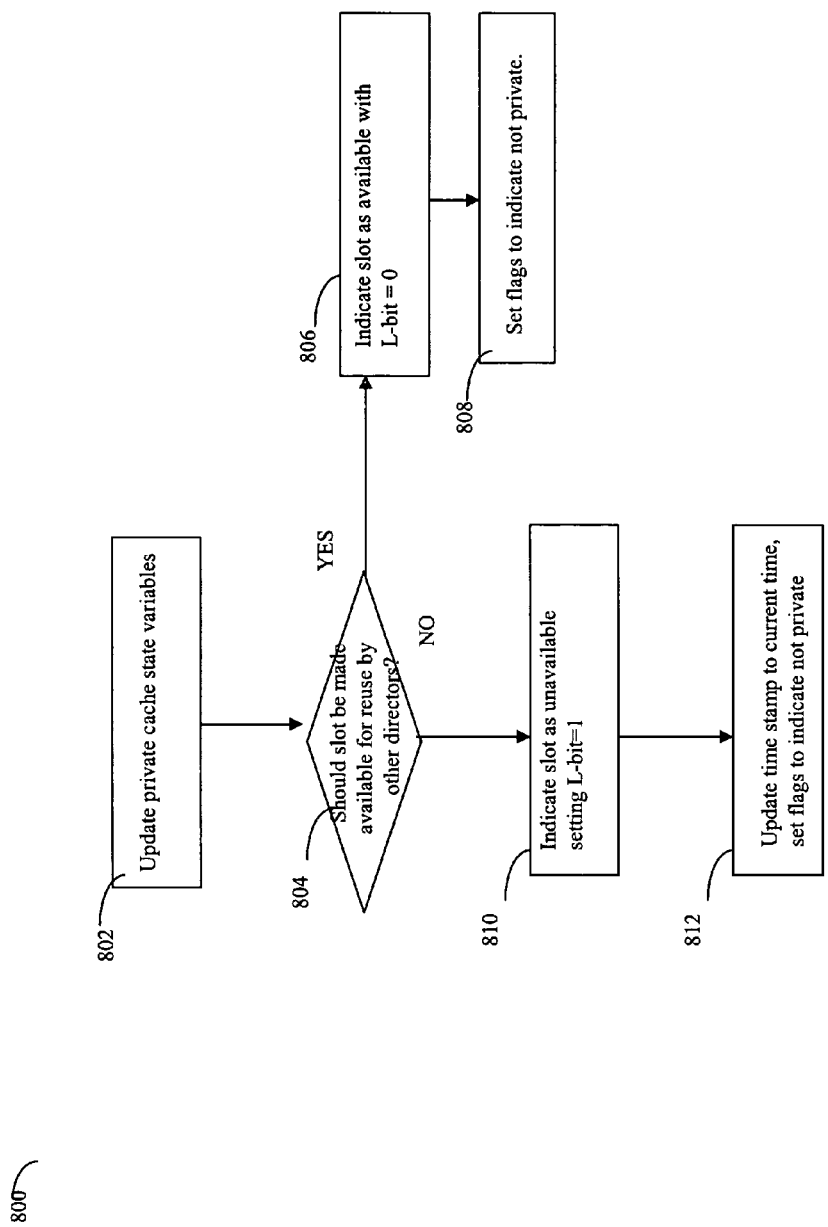
FIG. 16 is a flowchart of more detailed processing steps in one embodiment for performing a pop operation.

Referring now to FIG. 16, shown is a flowchart 800 of processing steps that may be performed in an embodiment as part of a pop operation for popping or removing a top element on the private stack of a director. The processing steps of FIG. 16 may be performed by each director using code included in each director. As part of performing the processing steps of 800 in this example, it is assumed any necessary locks are acquired and released when modifying the data in the cache slot currently being popped or removed from the stack for use. The slot currently being popped should have an L-bit with a value of 1 indicating that the current slot is unavailable and is not part of the shared cache for use by another director, and a private indicator should be set from a previous push. Generally, the processing of flowchart 800 sets the appropriate indicators and updates the appropriate cache management structures, variables, and the like in accordance with the use of the cache slot request.

At step 802, private cache state variables may be updated. Step 802 modifies those variables used in maintaining the private cache structure, such as pointers and/or counters, in an embodiment as in step 810. At step 804, a determination is made as to whether the current cache slot is to be made available for reuse by all directors once the data for the associated I/O operation for which this pop is being performed has been placed in the cache slot. If so, control proceeds to step 806 where the cache slot is indicated as available for use and inclusion in the shared cache by setting the L-bit to 0. Control proceeds to step 808 where the appropriate flag bits are set to indicate the cache slot is not private. Step 808 may also include other processing as needed to maintain cache coherency and any cache management structures in an embodiment as also described elsewhere herein. Such processing may include, for example, updating other information about the cache slot (i.e., nondata cache slot having zero timestamp, data cache slot having nonzero timestamp), updating cache management structures (such as updating pointers used in managing the cache structures of FIG. 3), and the like.

If step 804 determines that the cache slot is not being made available for reuse by the directors and not returned to the shared cache, control proceeds to step 810 where the L-bit is set to indicate this cache slot as unavailable. Control proceeds to step 812 where additional cache slot information may be updated to maintain cache coherency and cache structures that may be included in an embodiment as also described elsewhere herein. For example, in one embodiment, the timestamp may be updated to the current timestamp and the cache flags set to indicate the cache slot as non-private.

It should be noted that if an I/O operation is a write operation, for example, the data may be placed into the cache slot, marked as write pending, and actually written out to the device at a later time. If the I/O operation is a write, the cache slot is not returned to the shared cache until a later undetermined time after the destaging of the write pending data. In connection with a cache slot request for write operation data, processing steps may be performed for which the condition at step 804 evaluates to NO, to not place the cache slot in the shared cache. If the operation is a read operation, in contrast to the write, the cache slot may be reused and is returned to the shared cache since there is no destaging of data. In connection with a cache slot request for read operation data, processing steps may be performed for which the condition at step 804 evaluates to YES to place the cache slot in the shared cache. The cache slot may be immediately available for reuse since there is no waiting for data in the cache slot to be destaged prior to reuse of the cache slot.

Note that in connection with performing the processing steps for modifying and accessing an element of the private cache, steps may be performed to attempt to acquire the necessary lock(s). In one embodiment, a cache slot lock may be obtained prior to modifying data included in the cache slot. The lock may then be released after modification is complete. It may be possible to have a race condition in which two writers are attempting to access and modify the same cache slot. This may cause a temporary locking error to occur. Subsequent attempts to acquire the lock may succeed. Thus, an embodiment may perform a specified number of retries in the event that a locking failure occurs. The following illustrates an example of when such as condition may occur for directors A and B.

| | |
|---|---|
| A: | Reads extent X including slot S with L-bit = 0 |
| B: | Locks S, updates L-bit = 1 |
| B: | uses S |
| B: | return S by pushing to B's private stack, releases lock |
| A: | looking for available slots in cache and locks S as part of finding a new available slot processing (failed to obtain slot from private cache and use "normal" processing to locate an available slot). |
| step B1: B: | tries to lock slot S as part of pop processing and fails to lock |
| A: | finds mismatch with compare and swap with L-bit value and releases lock on S |
| step B2: B: | In an embodiment with a specified number of retries, B retries to acquire lock on S and now succeeds. Otherwise, if no specified number of retries, the "pop failed" from step B1 causes processing to continue with "normal" processing to locate an available slot. |

Although the foregoing processing steps for the race condition and additional detail processing for a push operation (FIG. 15) and pop operation (FIG. 16) are described with reference to the tag-based cache, one of ordinary skill in the art will appreciate that these steps may be adapted and performed in connection with other cache implementations.

What will now be described in FIGS. 17-20 are processing steps that may be performed in an embodiment in connection with obtaining a cache slot from the shared cache in connection with what is characterized as "normal processing" to obtain a cache slot as in step 456 of FIG. 10 when there are no available slots in the private stack as may be maintained for each director included in the data storage system. Note that an L-bit setting of 1 indicates that a cache slot is not available for use and may mean that the cache slot is included in the private cache of a director or is not included in a private cache but is otherwise in use. It should be noted that the processing of FIGS. 17-20 set forth herein is also described in pending U.S. patent application Ser. No. 10/080,321 filed Feb. 21, 2002, entitled CACHE MANAGEMENT VIA STATISTICALLY ADJUSTED TIME STAMP QUEUE, which is incorporated by reference herein.

Figure 17:
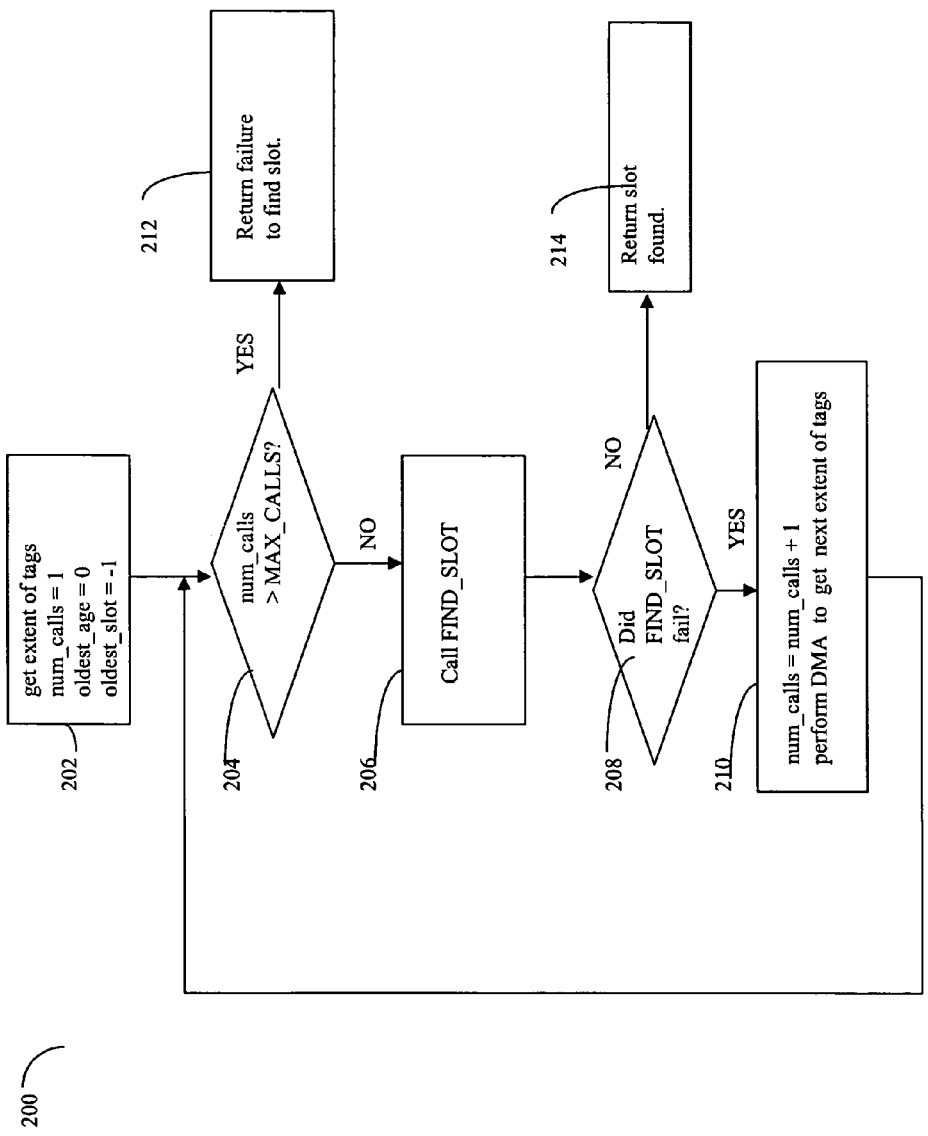
FIGS. 17-20 are flowcharts of processing steps of an embodiment for obtaining a cache slot from the shared cache.

Referring now to FIG. 17, shown is a flowchart of steps of an embodiment for obtaining a slot from the cache. Generally, the technique searches for an available slot or displaces the oldest slot. These steps may be performed by each DA or other processor, for example, within a system such as described in connection with FIG. 2A. It should be noted that although these processing steps are described with reference to a tag-based cache, one of ordinary skill in the art will appreciate that these processing steps may be extended for use in connection with other cache implementations, such as the embodiment of the cache structure described elsewhere herein FIGS. 3 and 4.

At step 202, a first extent of tags is read from global memory and a local copy is made. Additionally, variable num_calls is initialized to 1, oldest_slot=−1 and oldest_age to 0. Num_calls tracks the number of times FIND_SLOT is called and fails after a predetermined number. Oldest_age tracks the age of the oldest slot and oldest_slot accordingly is an identifier corresponding to the oldest slot. Control proceeds to step 204 where a determination is made as to whether the number of calls exceeds a predetermined maximum, MAX_CALLS. If so, control proceeds to step 212 where a failure is returned. Otherwise, control proceeds to step 206 where a routine FIND_SLOT is called, which is described in more detail in following paragraphs. FIND_SLOT attempts to locate and return a cache slot for use. It should be noted that MAX_CALLS may be a predetermined value that may vary in accordance with each embodiment. For example, in one embodiment, MAX_CALLS is 100.

It should be noted that in connection with step 202, a new extent or portion of tags may be obtained with each invocation of steps of flowchart 200. Thus, each time each processor attempts to find a slot within an extent of tags, a new extent of tags is obtained. This technique may be used in connection with distributing the number of slots available for use in any particular extent to approximate a uniform distribution. It may be desirable to have a uniform distribution of the number of free slots in any particular extent. Using a new extent each time is one technique that may be used in connection with attempting to obtain the uniform distribution of slots available for use.

Additionally, when there are multiple processors each attempting to locate an available slot, techniques may be used in connection with determining the next subsequent extent of tags for each processor in order to minimize clustering. In other words, techniques may be used such that each processor attempts to locate an available slot from different extents of tags to minimize the likelihood that a first and a second processor look in the same extent of tags. Accordingly, these techniques may also minimize the likelihood that any two processors may be attempting to access the same available slot.

Control proceeds to step 208 where a determination is made if FIND_SLOT succeeded or failed in locating a cache slot for use. If a slot is found, control proceeds to step 214 where the determined slot is returned. Otherwise, if FIND_SLOT failed, control proceeds to step 216 where num_calls is incremented by 1 and a global memory read is performed to get the next extent of tags. Control then proceeds to step 204 where processing then continues.

Figure 18:
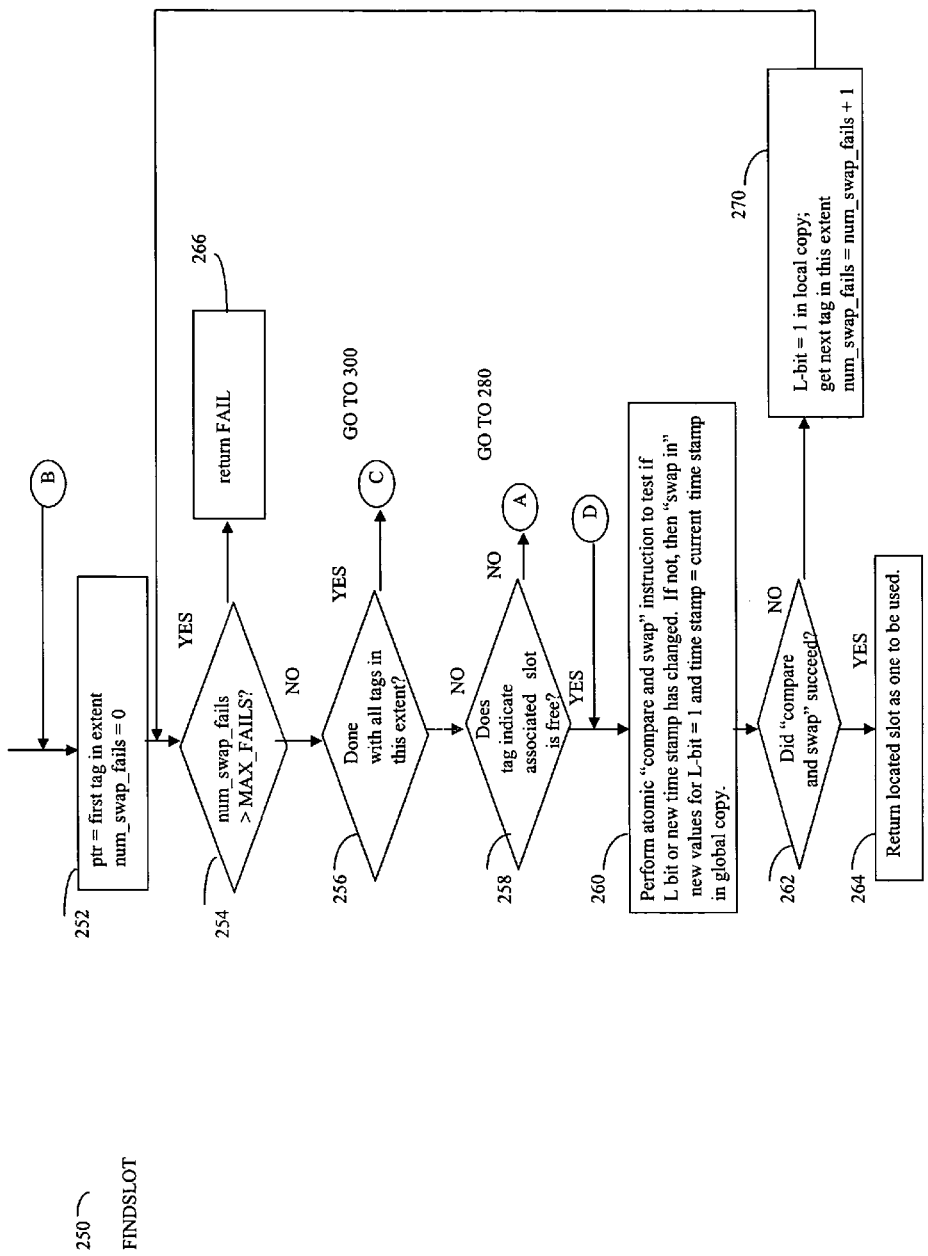

Referring now to FIG. 18, shown is a flowchart 250 of processing steps performed in connection with the FIND_SLOT routine. At step 252, ptr is assigned to point to the first tag in the current extent of tags. Additionally, the num_swap_fails tracking variable is initialized to 0. num_swap_fails counts the number of failed swaps as described in following paragraphs. At step 254, a determination is made as to whether num_swap_fails exceeds a predetermined maximum. In one embodiment, MAX_FAILS may be 4. Other embodiments may have other values for MAX_FAILS that may vary from that described herein. It should be noted that each DA, director or processor has its own unique pointer (ptr) such that each DA, for example, may attempt to obtain a slot from locations different than that of other DAs. If a determination is made at step 254 that the maximum number of failed swap attempts has been exceeded, control proceeds to step 266 where failure is returned. Otherwise, control proceeds to step 256.

At step 256, a determination is made as to whether processing is complete for all tags in this extent. If so, control proceeds to step 300 in FIG. 20 where a determination is made as to whether there is an "oldest" slot. If so, this slot is used as the available slot, as in step 304, and control proceeds to step 260. Otherwise, control proceeds to step 302 where failure is returned.

If, at step 256, a determination is made that all tags in this extent have not been examined, in accordance with the local copy, control proceeds to step 258 where a determination is made as to whether the current slot identified by the current tag is free or available. In accordance with the embodiment described herein, this may be determined using the time stamp where a particular value may be placed in each time stamp field when a corresponding slot is returned to the pool of free or available slots. Any particular value may be used in an embodiment, such as a time stamp of 0, which may vary in accordance with each embodiment. If it is determined that the current slot is free, control proceeds to step 260 where an atomic operation may be performed. In one embodiment, this may be performed using an atomic "compare and swap" instruction which tests the L-bit and time stamp of the current tag to see if the values of either have changed since the determination at step 258. If the values have not changed, then the instruction also "swaps in" or updates values of the L-bit and time stamp fields by setting the L-bit to 1 and setting the time stamp to be that of the current time. It should be noted that this update of the current tag is performed to the copy in global memory. Additionally, the processing performed at step 260 is also performed using the copy from global memory.

Performing the compare and swap as an atomic, uninterrupted operation may be used to guarantee exclusive access to the shared resource of the cache or shared memory since, for example, multiple DAs may be attempting to access the same portion of shared memory, such as the same cache slot. The determination at step 258 may be performed, for example, by two different DAs reaching the same conclusion that a particular slot is available. However, only one of the DAs may actually be granted or obtain the slot since the atomic compare and swap operation may only be performed by one DA at a time in an uninterrupted fashion. The second DA's compare and swap will result in failure in that the values were changed by the first DA's successful execution of the compare and swap instruction.

The processing performed in connection with step 260 may be performed atomically using other instructions and/or techniques known to one of ordinary skill in the art, for example, in connection with accessing a shared resource such as the shared memory or cache as described herein. One example of the atomic performance or processing steps is the atomic "compare and swap" instruction which may be implemented in hardware and/or software. Another embodiment may utilize other techniques in performing an equivalent of this atomic operation by performing the following pseudo-code steps:

1. lock portion of shared resource
2. if L bit or time stamp has changed
   then FAIL and unlock shared resource
   else /*SUCCESS*/
   swap in new values as in step 260
   unlock shared resource The foregoing may be implemented used different mechanisms and techniques included in a system for providing exclusive access to a shared resource, such as the shared memory used as the cache in this instance.

It should be noted that the granularity used in connection with the lock and unlocking of a resource may vary in accordance with each particular embodiment. For example, in one embodiment, a locking mechanism may be provided which locks a minimum of a word size. Other embodiments may have other limitations. It may be desirable to lock for exclusive access the smallest amount or unit allowable within limits of a particular system which is also the size of a tag or portion thereof being accessed by multiple processors.

At step 262, a determination is made as to whether the compare and swap instruction succeeded. If so, control proceeds to step 264 where the located slot is returned as the one to be used. Otherwise control proceeds to step 270 where the L-bit is set in the local copy so that this slot is not examined again. The next tag is obtained in the current extent and the num_swap_fails is incremented by 1. Control proceeds to step 254.

Figure 19:
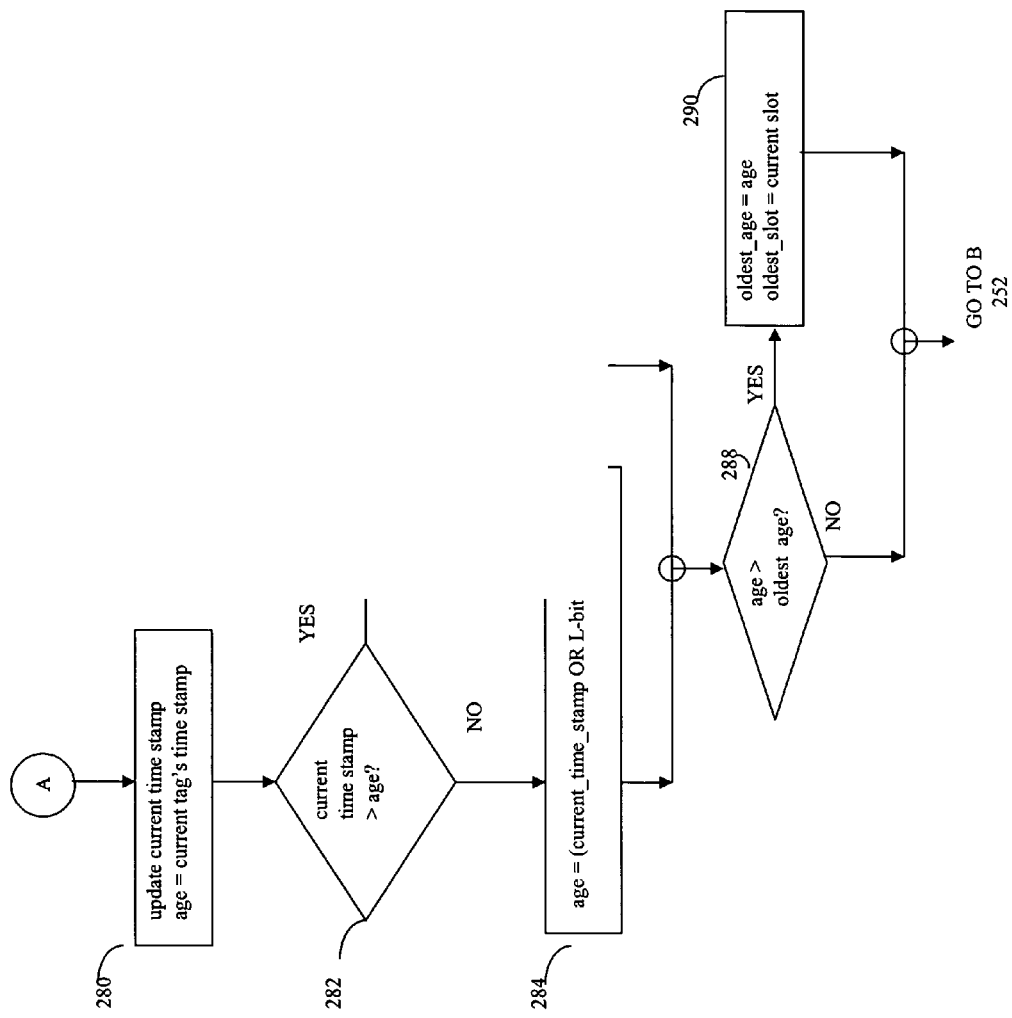
Figure 20:
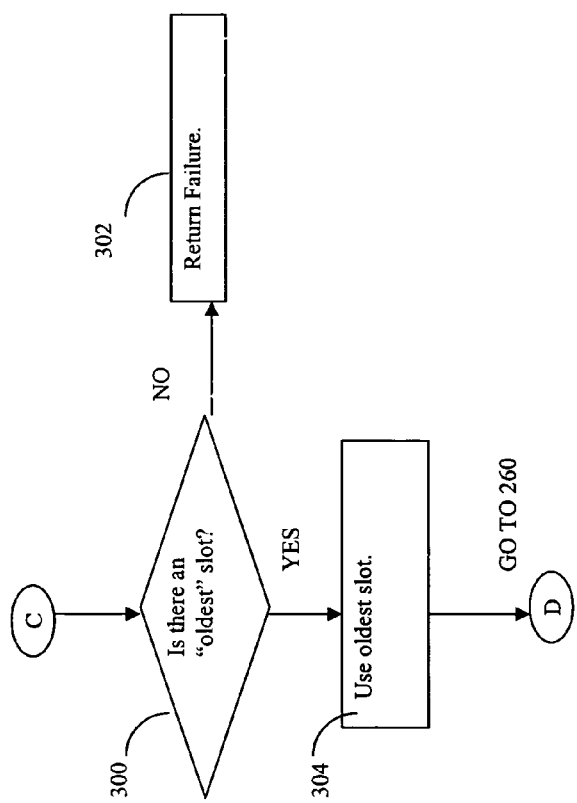

If a determination is made at step 258 that the current tag is not free, control proceeds to step 280 which is continued in FIG. 19. At step 280, the current time stamp is updated and the temporary variable age is assigned the current tag's time stamp value. It should be noted that the processing step of updating the current time stamp may be performed in any one of a variety of different increment units. For example, in one embodiment, current time stamp may be updated in increments of 4 units. In this example, multiple processors may be using the same cache in which each of the processors has its own clock and associated time used in connection with time stamps. Each of the processor clocks may have time synchronization differences such that at a particular point in time, time stamps produced by any two of the clocks may differ. A time stamp increment, such as 4 units, may be selected in accordance with any such synchronization differences when comparing or using time stamp values as in processing herein. In one embodiment, the increment is 4 units=2 seconds, each unit being ½ second. This increment amount may vary in accordance with embodiment.

At step 282, a determination is made as to whether the current time stamp is greater than the age. If so, control proceeds to step 286 where age=current time stamp–age. Otherwise, control proceeds to step 284 where age=(current time stamp OR L-bit set)–age.

The processing at steps 282, and 286 obtain an absolute value of the age of the current slot which is a difference of the amount of time from when the slot was last used subtracted from the current time. The processing of steps 282, 284 and 286 are used in connection with handling time stamp values which "wrap around" for very large values causing the L-bit to be set. When this point is reached, the age starts over at a new value similar to a counter which, when its maximum is reached, is reset.

Control proceeds to step 288 where a determination is made as to whether the age of the current slot is greater than the oldest_age of the slots visited thus far. If so, control proceeds to step 290 where information is retained about the current slot, such as updating the oldest_age and the corresponding identifier. Control then proceeds to step 252.

As data associated with a slot is moved in and out of cache, the cache index or directory, for example as illustrated in FIG. 5, may accordingly be updated.

It should be noted that in the foregoing embodiment using tags for cache management, a particular slot may be noted as "not available" if the L-bit is set (=1) in a global copy. A cache slot which is "not available" may be characterized as one that includes volatile data and should not be removed from the cache. Use of the L-bit as a technique for indicating when a slot is not available may be used to manage a shared cache, for example, rather than an using a cache implementation with linked lists and pointers as described elsewhere herein. Similarly, a slot may be indicated as "available" by clearing (=0) the L-bit. The associated time stamp may be set to any one of different values affecting when a particular slot may be selected for use. For example, the time stamp may be set to a value of 0 indicating that the data in the cache slot is invalid.

Adjusting the time stamp to different times may be used when freeing a cache slot, such as, for example, when setting the L-bit to 0. The time stamp may be set to a particular value to indicate an age of a slot. As described elsewhere herein, clearing the L-bit and resetting the time stamp to 0 in a global memory copy of a tag may be used to indicate that this slot should be selected prior to others having non-zero time stamps. A time stamp of zero in this instance may be used to indicate that the cache slot contains meaningless data. A non-zero time stamp may also affect when a particular cache slot is selected, for example, since the "oldest" cache slot may be selected from all time slots having non-zero time stamps. It should be noted that in a cache slot with an L-bit=0, a non-zero time stamp may be used to indicate that although the slot is "available", the slot does contain valid data that may also be used, for example, in connection with a write pending data portion that has been written out to disk and subsequently for some time the data still remains in the cache. Accordingly adjusting the time stamp may cause the age determination of the associated slot to vary. This technique may be used in connection with causing data in particular slots to remain in the cache for longer or shorter periods of time. This time stamp adjustment may be used, for example, as an alternative to physically inserting a slot at different points in a cache data structure, for example, such as in adjusting pointers in a linked list. Depending on techniques and policies that may be included in each embodiment, it may be desirable to have slots of data having particular characteristics remain in cache longer than other slots having other characteristics.

In particular, an embodiment may adjust the time stamp value of an associated slot in accordance with the Fall Through Time (FTT). Generally, the FTT refers to the average amount of time it takes for an unpromoted slot once it is in the queue to exit the queue. In other words, it is the average amount of time it takes a slot to pass through or "fall" through the queue from the head position and then exit out of the queue through the tail position, for example, referencing the illustration of FIG. 4. A slot may be added to the head position or at another position in accordance with the relative time stamps of those in the queue. The FTT is described in issued U.S. Pat. No. 5,592,432, Vishlitzky et al, which is incorporated herein by reference, and in pending U.S. patent application Ser. No. 10/853,035, filed May 25, 2004, entitled CACHE FALL THROUGH TIME ESTIMATION, which is incorporated by reference herein.

The FTT may be calculated for each slot by taking a first time stamp at the position when an element is lastly placed at the head of the replacement queue, and then taking a second time stamp value when that same slot exits the replacement queue (such as when a slot exits or leaves at the tail). The difference between the second ending time stamp value and the starting or first time stamp value for each particular slot may be used in calculating an average amount of time. It is this average amount of time that represents the FTT for a large number of slots.

It should be noted that in one embodiment of the foregoing, it was determined that the tags within each extent approximates a uniform distribution with respect to the time stamps.

An embodiment may provide different initial values for use with techniques described herein with different processors, for example, such as may be associated with a DA or other director. For example, in one embodiment, when determining the starting extent, each processor may begin with the first extent of a different memory bank. As additional extents are requested by each processor, a next subsequent extent may be obtained by updating the extent pointer address by an increment value also unique for each processor. For example, in one embodiment, each processor may have its own unique value and all the extent increments of all the processors may also be relatively prime. Additionally, the number of extents may not be a multiple of any prime number that is an increment extent value. The foregoing and other techniques may be used in an embodiment to minimize clustering of different processors in which different processors are attempting to obtain cache slots which are clustered together.

In one embodiment, each director or processor may have its own unique processor identifier number. This identifier number may be used in assigning an initial value for a starting extent for each processor. For example, each processor may be assigned an initial value of a starting extent number as follows:

```
for I = 1 to max for all processors
{
    current_proc_id = identifier of processor I;
    initial_extent_value_processor_pointer[I] =
        (number of extents in all banks * current_proc_id)/ (max number of
                                                              processors)
    I = I + 1
}
``` where I is an index over the range of all processors and each processor has an associated unique processor identifier. The initial value of a starting extent for each processor is selected in accordance with the unique processor identifier. In this embodiment, the memory may be organized into banks and number of extents in all banks refers to the total number of extents in all of the memory banks. As described elsewhere herein, each memory bank may include a particular number of extents that may vary in accordance with each embodiment. Another embodiment may use the processor identifier in connection with determining a random number used in selecting an initial value for each processor's starting extent.

In addition to selecting an initial value of a starting extent for each processor, an extent increment may be determined for how to select the next extent for each processor. In one embodiment, this increment may be the next sequential extent for each processor, for example, determined by adding a constant of one (1) to a current extent number. Other embodiments may use different techniques in determining the initial value of a starting extent and for an extent increment.

An embodiment may also use the foregoing cache management technique in a system which provides for also utilizing an alternate technique for cache management. This may be implemented, for example, utilizing a switch providing for selection of the foregoing technique or another, such as cache management using pointer manipulation.

The foregoing provides a flexible and efficient technique for cache management. Slots may be added or removed from the cache by updating values in an associated tag. Other embodiments may utilize pointer management techniques in accordance with particular data structure of the associate cache that may be more expensive in terms of execution time and memory. Exclusive access to the shared resource of the cache may be implemented utilizing the atomic instruction described herein or other equivalent. This may be used as alternative for a more expensive locking mechanism, for example, that may exclude all others from accessing any portion of the cache. It should be noted that the atomic instruction does not exclude all other from accessing the cache but rather guarantees performance of an atomic operation to a portion of the cache. Use of the foregoing techniques described herein may be more apparent in a system, for example, having a large number of processors accessing the shared memory, or those with a slow global memory access time.

It should be noted that the foregoing includes techniques used in connection with a portion of shared memory used as a cache. These techniques may also be used in connection with other types of shared resources.

Different techniques may be used in an embodiment in determining the extent increment described herein. In one embodiment, each director or processor may have it's own unique extent increment selected with the goal of minimizing the number of collisions between multiple processors and minimizing the amount of clustering between any two or more processors. That is, techniques may be used by a processor trying to find a slot, such as in connection with FIND SLOT processing, to minimize the occurrence of the processor accessing a slot which is currently being accessed and/or used by another processor.

The various parameters, such as the number of extent increments, "n", the director or processor identifiers, the particular array element associated with each processor or director, and the like may be specified as part of initialization processing. Values for these parameters may be specified, for example, as part of system configuration data which is read upon initializing the data storage system, such as the Symmetrix data storage system. Similarly, values for these parameters may also be modified by updating the system configuration file and reloading the data stored therein, or through other utilities that may be included in an embodiment, such as a utility providing for dynamic updating of parameter values which may or may not modify the definitions stored within a configuration file. The particular techniques used in connection with specifying and/or modifying values described herein may vary in accordance with each embodiment.

Figure 21:
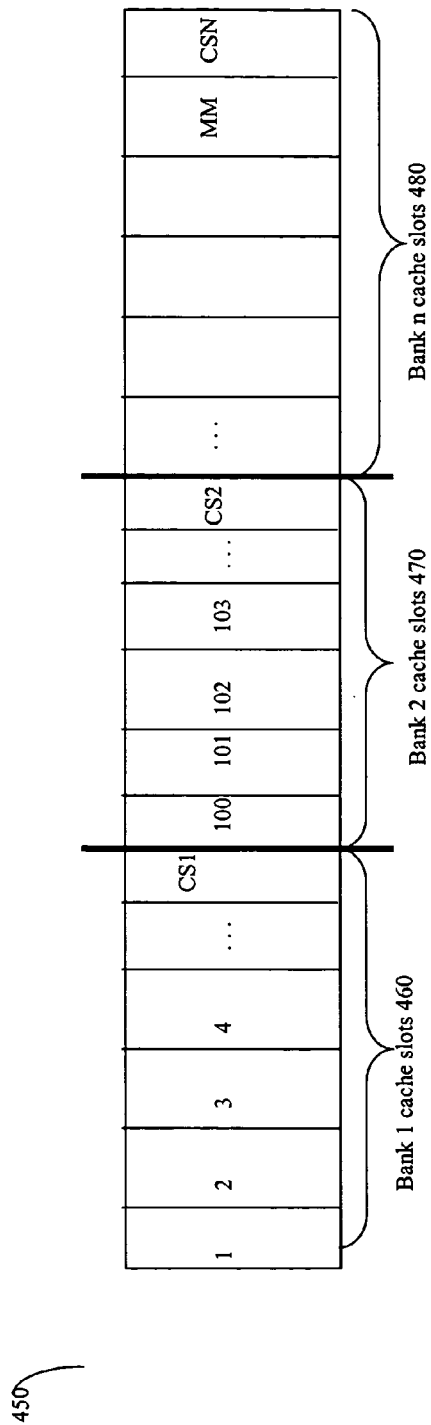
FIG. 21 is an example of an embodiment of a tag-based cache with multiple memory banks.

Referring now to FIG. 21, shown is an example representation of a tag-based cache structure comprising multiple memory banks or units. In one embodiment, the cache slots in each memory bank may be referenced sequentially so that the memory bank boundaries and mapping of a cache slot number to a particular physical cache slot is transparent to the director. Included in 450 are n-memory banks represented a continuum of cache slots from 1 to MM. An embodiment may map a logical cache slot number, such as 100, to a particular bank number and cache slot within the bank, such as cache slot 1 in bank 2, in order to access and modify the necessary portions in performing the processing steps described herein.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for cache management, comprising:
providing for each processor a private cache including only nondata cache slots;
providing a shared cache including cache slots accessible by a plurality of processors;
receiving a request to allocate a cache slot for use by said each processor;
selecting a nondata cache slot from said private cache for allocation for data and nondata uses in connection with said request if said private cache includes any nondata cache slots; and
otherwise selecting a cache slot from said shared cache for allocation in connection with said request.

2. The method of claim 1, wherein the method for cache management is used a data storage system, each processor being a director included in the data storage system, and said cache slot is selected in connection with processing an I/O operation.

3. The method of claim 1, further comprising performing by said processor:
determining whether a first cache slot is a data cache slot or a non-data cache slot;
if said first cache slot is a non-data cache slot, designating said first cache slot as being included in said private cache of said processor; and
if said first cache slot is a data cache slot, indicating that said first cache slot is available for use by all of said plurality of processors.

4. The method of claim 3, further comprising:
determining if said private cache of said processor is full; and
indicating that said first cache slot is available for use by all of said plurality of processors if said private cache is full.

5. The method of claim 4, wherein said first cache slot is indicated as being included in said private cache or said shared cache in accordance with a first indicator associated with said first cache slot.

6. The method of claim 5, wherein said first cache slot is included in said private cache and includes a unique processor identifier identifying the particular processor that is associated with said private cache.

7. The method of claim 6, wherein said first cache slot is indicated as unavailable for use by any processor other than said particular processor by a second indicator in said cache slot.

8. The method of claim 5, further comprising:
updating said first indicator to indicate that said first slot is included in said shared cache after obtaining a lock on said first slot for exclusive access.

9. The method of claim 8, further comprising:
retrying to obtain said lock a plurality of times if previous attempts to obtain said lock indicate that another processor currently has said lock.

10. The method of claim 5, wherein said first cache slot is indicated as being a private cache slot and is physically located in a memory next to a second cache slot indicated as being included in said shared cache available for use by a plurality of processors.

11. The method of claim 1, wherein said selected cache slot is selected from said private cache slot and the method further comprising:
determining whether said cache slot is to be included in said shared cache in accordance with an I/O operation associated with said selected cache slot.

12. The method of claim 11, wherein said cache slot remains not available for reuse by said plurality of processors if data included in said cache slot is associated with a pending write operation.

13. The method of claim 11, wherein said cache slot is designated as available for reuse by said plurality of processors if said cache slot is associated with a read operation.

14. A computer program product comprising a computer readable medium with code stored thereon for cache management, the computer readable medium comprising code that:
provides for each processor a private cache including only nondata cache slots;
provides a shared cache including cache slots accessible by a plurality of processors;
receives a request to allocate a cache slot for use by said each processor;
selects a nondata cache slot from said private cache for allocation for data and nondata uses in connection with said request if said private cache includes any nondata cache slots; and
otherwise selects a cache slot from said shared cache for allocation in connection with said request.

15. The computer program product of claim 14, wherein the cache management is used a data storage system, each processor being a director included in the data storage system, and said cache slot is selected in connection with processing an I/O operation.

16. The computer program product of claim 14, further comprising code that causes said processor to perform:
   determining whether a first cache slot is a data cache slot or a non-data cache slot;
   if said first cache slot is a non-data cache slot, designating said first cache slot as being included in said private cache of said processor; and
   if said first cache slot is a data cache slot, indicating that said first cache slot is available for use by all of said plurality of processors.

17. The computer program product of claim 16, further comprising code that:
   determines if said private cache of said processor is full; and
   indicates that said first cache slot is available for use by all of said plurality of processors if said private cache is full.

18. The computer program product of claim 17, wherein said first cache slot is indicated as being included in said private cache or said shared cache in accordance with a first indicator associated with said first cache slot.

19. The computer program product of claim 18, wherein said first cache slot is included in said private cache and includes a unique processor identifier identifying the particular processor that is associated with said private cache.

20. The computer program product of claim 19, wherein said first cache slot is indicated as unavailable for use by any processor other than said particular processor by a second indicator in said cache slot.

21. The computer program product of claim 18, further comprising code that:
   updates said first indicator to indicate that said first slot is included in said shared cache after obtaining a lock on said first slot for exclusive access.

22. The computer program product of claim 21, further comprising code that:
   retries to obtain said lock a plurality of times if previous attempts to obtain said lock indicate that another processor currently has said lock.

23. The computer program product of claim 18, wherein said first cache slot is indicated as being a private cache slot and is physically located in a memory next to a second cache slot indicated as being included in said shared cache available for use by a plurality of processors.

24. The computer program product of claim 14, wherein said selected cache slot is selected from said private cache slot and the computer program product further comprising code that:
   determines whether said cache slot is to be included in said shared cache in accordance with an I/O operation associated with said selected cache slot.

25. The computer program product of claim 24, wherein said cache slot remains not available for reuse by said plurality of processors if data included in said cache slot is associated with a pending write operation.

26. The computer program product of claim 24, wherein said cache slot is designated as available for reuse by said plurality of processors if said cache slot is associated with a read operation.

* * * * *